US009722808B2

(12) United States Patent
Morita et al.

(10) Patent No.: US 9,722,808 B2
(45) Date of Patent: Aug. 1, 2017

(54) DATA TRANSMISSION SYSTEM, A TERMINAL DEVICE, AND A RECORDING MEDIUM

(71) Applicants: Kenichiro Morita, Tokyo (JP); Takuya Imai, Tokyo (JP); Shoh Nagamine, Kanagawa (JP)

(72) Inventors: Kenichiro Morita, Tokyo (JP); Takuya Imai, Tokyo (JP); Shoh Nagamine, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/113,338

(22) PCT Filed: Jan. 20, 2015

(86) PCT No.: PCT/JP2015/051424
§ 371 (c)(1),
(2) Date: Jul. 21, 2016

(87) PCT Pub. No.: WO2015/111588
PCT Pub. Date: Jul. 30, 2015

(65) Prior Publication Data
US 2017/0012793 A1 Jan. 12, 2017

(30) Foreign Application Priority Data

Jan. 22, 2014 (JP) .................. 2014-009104

(51) Int. Cl.
H04N 7/15 (2006.01)
H04L 12/18 (2006.01)
(Continued)

(52) U.S. Cl.
CPC .......... H04L 12/1822 (2013.01); G06F 13/00 (2013.01); H04L 12/18 (2013.01);
(Continued)

(58) Field of Classification Search
None
See application file for complete search history.

(56) References Cited

U.S. PATENT DOCUMENTS 5,001,705 A * 3/1991 Kobatake ............. H04L 1/1835
370/389
6,674,477 B1 1/2004 Yamaguchi et al.
(Continued)

FOREIGN PATENT DOCUMENTS

EP 0 905 976 A1 3/1999
EP 1 650 905 A1 4/2006
(Continued)

OTHER PUBLICATIONS

Ken Ohta, Spatial Resolution Control for Content-based Mobile Multimedia Access Protocol, IPSJ SIG Notes, Dec. 4, 1997, vol. 97, No. 117, pp. 69 to 74.
(Continued)

Primary Examiner — Creighton Smith
(74) Attorney, Agent, or Firm — Oblon, McClelland, Maier & Neustadt, L.L.P.

(57) ABSTRACT

A data transmission system including a plurality of terminal devices arranged in a communication network and configured to transmit or receive content data. At least one terminal devices configured to receive content data transmitted from another terminal device, among the plurality of terminal devices, includes a reception priority management unit configured to manage priority of two or more content data addressed to the own terminal device, and a data reception control unit configured to, based on an output time interval of output signals corresponding to priority data whose priority managed by the reception priority management unit is high among two or more content data being received, request a transmission source configured to transmit content
(Continued)

data having priority lower than the priority data, to perform control to stop transmitting the content data.

15 Claims, 22 Drawing Sheets

(51) Int. Cl.
| | | |
|---|---|---|
| G06F 13/00 | (2006.01) | |
| H04M 3/56 | (2006.01) | |
| H04N 21/239 | (2011.01) | |
| H04L 29/06 | (2006.01) | |
| H04L 12/58 | (2006.01) | |
| H04L 12/825 | (2013.01) | |
| H04L 12/801 | (2013.01) | |
| H04L 12/851 | (2013.01) | |
| H04L 12/26 | (2006.01) | |
| H04L 12/853 | (2013.01) | |

(52) U.S. Cl.
CPC .............. *H04L 43/16* (2013.01); *H04L 47/11* (2013.01); *H04L 47/24* (2013.01); *H04L 47/2416* (2013.01); *H04L 47/266* (2013.01); *H04L 47/29* (2013.01); *H04L 51/26* (2013.01); *H04L 65/1083* (2013.01); *H04L 65/403* (2013.01); *H04M 3/56* (2013.01); *H04N 7/152* (2013.01); *H04N 21/239* (2013.01)

(56) References Cited

U.S. PATENT DOCUMENTS

| | | |
|---|---|---|
| 2002/0087723 A1 | 7/2002 | Williams et al. |
| 2004/0095885 A1* | 5/2004 | Yang .................. H04L 12/5693 370/235.1 |
| 2004/0114576 A1 | 6/2004 | Itoh et al. |
| 2004/0120345 A1 | 6/2004 | Yamaguchi et al. |
| 2004/0212729 A1 | 10/2004 | Yamaguchi et al. |
| 2004/0237122 A1 | 11/2004 | Yamaguchi et al. |
| 2005/0129036 A1* | 6/2005 | Sawabe ............. H04L 12/40143 370/401 |
| 2006/0088036 A1 | 4/2006 | De Prezzo |
| 2006/0268692 A1* | 11/2006 | Wright .................... H04L 47/10 370/229 |
| 2007/0201563 A1 | 8/2007 | Yamaguchi et al. |
| 2008/0232251 A1 | 9/2008 | Hirayama et al. |
| 2010/0129036 A1* | 5/2010 | Hodono .............. B32B 38/1841 385/88 |
| 2011/0142052 A1* | 6/2011 | Kulkarni ............... H04L 47/245 370/392 |
| 2012/0002003 A1 | 1/2012 | Okita et al. |
| 2012/0030357 A1 | 2/2012 | Linsky et al. |
| 2012/0063526 A1* | 3/2012 | Xiao .................... H04L 1/0018 375/259 |
| 2012/0307829 A1 | 12/2012 | Hyoudou |
| 2014/0118475 A1 | 5/2014 | Nagamine et al. |
| 2014/0240450 A1 | 8/2014 | Morita et al. |
| 2014/0368410 A1 | 12/2014 | Imai et al. |

FOREIGN PATENT DOCUMENTS

| | | |
|---|---|---|
| JP | 01-011460 | 1/1989 |
| JP | 2003-152752 | 5/2003 |
| JP | 2004-312560 | 11/2004 |
| JP | 2010-093505 | 4/2010 |

OTHER PUBLICATIONS

International Search Report issued on Feb. 24, 2015 in PCT/JP2015/051424 filed on Jan. 20, 2015.
Extended European Search Report issued on Jan. 16, 2017 in Patent Application No. 15740918.6.

* cited by examiner

| PRIORITY | RECEPTION DATA ID | LAST OUTPUT TIME | RECEPTION STATE | CAUSE OF STOPPING RECEPTION |
|---|---|---|---|---|
| - | NY0011A | - | RECEPTION IS REQUIRED | - |
| - | NY0012V | - | RECEPTION IS REQUIRED | - |
| - | OS0031A | - | RECEPTION IS REQUIRED | - |
| - | OS0032V | - | RECEPTION IS REQUIRED | - |
| - | WA0021A | - | RECEPTION IS REQUIRED | - |
| - | WA0022V | - | RECEPTION IS NOT REQUIRED | - |

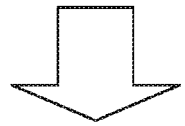

(b)

| PRIORITY | RECEPTION DATA ID | LAST OUTPUT TIME | RECEPTION STATE | CAUSE OF STOPPING RECEPTION |
|---|---|---|---|---|
| 1 | NY0011A | - | RECEPTION IS REQUIRED | - |
| 2 | NY0012V | - | RECEPTION IS REQUIRED | - |
| 3 | WA0021A | - | RECEPTION IS REQUIRED | - |
| 4 | OS0031A | - | RECEPTION IS REQUIRED | - |
| 5 | OS0032V | - | RECEPTION IS REQUIRED | - |
| - | WA0022V | - | RECEPTION IS NOT REQUIRED | - |

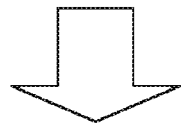

(c)

| PRIORITY | RECEPTION DATA ID | LAST OUTPUT TIME | RECEPTION STATE | CAUSE OF STOPPING RECEPTION |
|---|---|---|---|---|
| 1 | NY0011A | 1233*** | RECEPTION IS REQUIRED | - |
| 2 | NY0012V | 1233*** | RECEPTION IS REQUIRED | - |
| 3 | WA0021A | 1233*** | RECEPTION IS REQUIRED | - |
| 4 | OS0031A | 1233*** | RECEPTION IS REQUIRED | - |
| 5 | OS0032V | 1233*** | RECEPTION IS REQUIRED | - |
| - | WA0022V | - | RECEPTION IS NOT REQUIRED | - |

(PRIORITY DATA: rows 1–2 in (c))

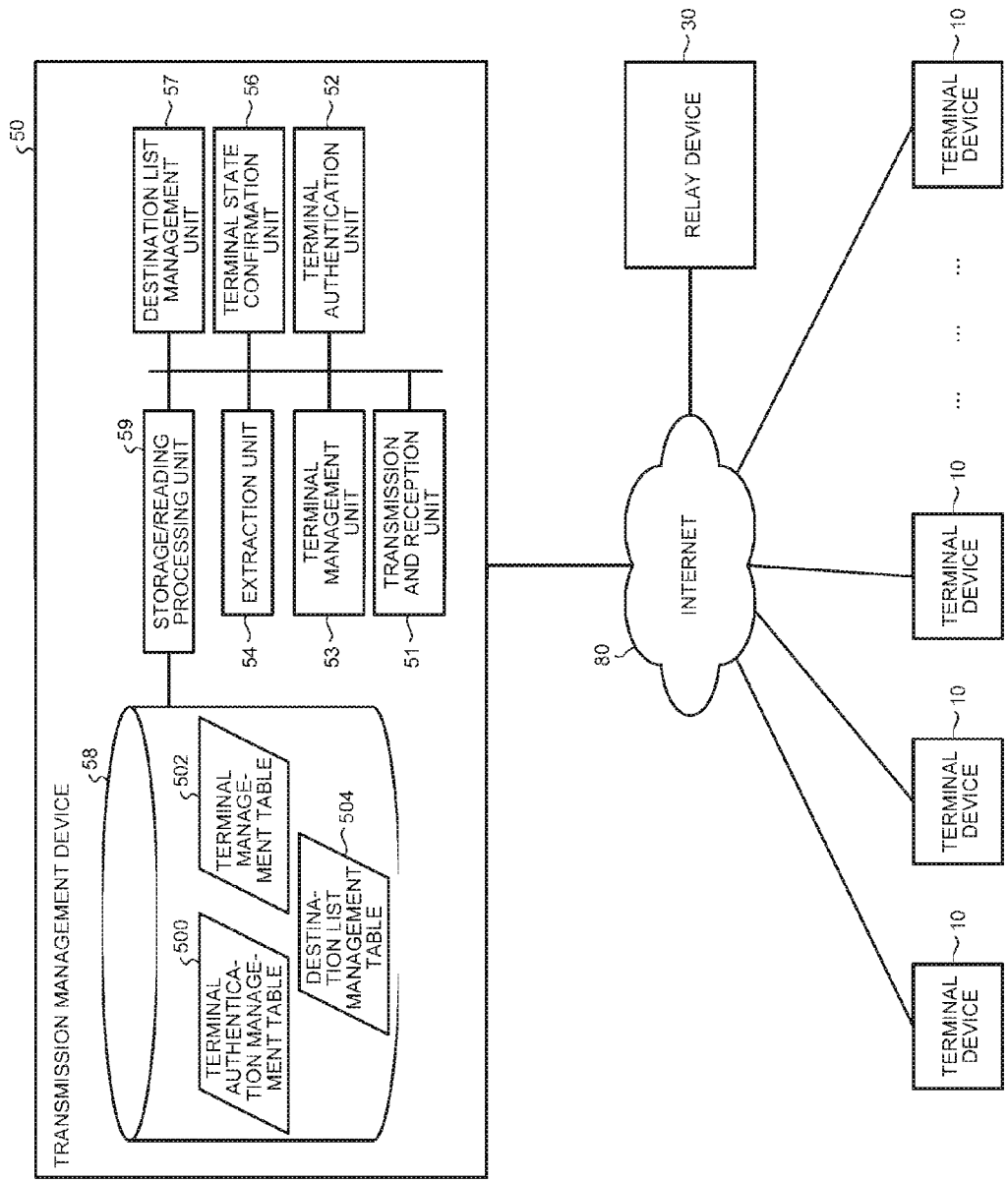

FIG.10

500 TERMINAL AUTHENTICATION
MANAGEMENT TABLE

| TERMINAL ID | PASSWORD |
|---|---|
| XTK0001 | 1234 |
| ⋮ | ⋮ |
| XOS0002 | 3456 |
| ⋮ | ⋮ |
| YOS0003 | 5678 |
| ⋮ | ⋮ |

FIG.11

502 TERMINAL MANAGEMENT TABLE

| TERMINAL ID | TERMINAL NAME | OPERATION STATE | RECEPTION DATE AND TIME | IP ADDRESS |
|---|---|---|---|---|
| XTK0001 | X COMPANY TOKYO HEAD OFFICE TERMINAL 1 | ONLINE (TRANSMISSION IS POSSIBLE) | 2014.11.10.13:40 | 1.2.1.3 |
| XTK0002 | X COMPANY TOKYO HEAD OFFICE TERMINAL 2 | ONLINE (TRANSMISSION IS POSSIBLE) | 2014.11.10.12:00 | 1.2.1.4 |
| XTK0003 | X COMPANY TOKYO HEAD OFFICE TERMINAL 3 | OFFLINE | 2014.11.09.12:40 | 1.2.1.5 |
| ... | ... | ... | ... | ... |
| XOS0001 | X COMPANY OSAKA BRANCH OFFICE TERMINAL 1 | ONLINE (IN TRANSMISSION) | 2014.11.10.13:45 | 1.2.2.3 |
| XOS0002 | X COMPANY OSAKA BRANCH OFFICE TERMINAL 2 | OFFLINE | 2014.11.10.10:30 | 1.2.2.4 |
| XOS0003 | X COMPANY OSAKA BRANCH OFFICE TERMINAL 3 | ONLINE (TRANSMISSION IS POSSIBLE) | 2014.11.10.13:50 | 1.2.2.5 |
| ... | ... | ... | ... | ... |
| YOS0001 | Y COMPANY OSAKA BUSINESS OFFICE 1 | OFFLINE | 2014.11.09.11:25 | 1.2.3.3 |
| YOS0002 | Y COMPANY OSAKA BUSINESS OFFICE 2 | ONLINE (TEMPORARILY SUSPENDED) | 2014.11.10.12:45 | 1.2.3.4 |
| YOS0003 | Y COMPANY OSAKA BUSINESS OFFICE 3 | ONLINE (TRANSMISSION IS POSSIBLE) | 2014.11.10.12:45 | 1.2.3.5 |
| ... | ... | ... | ... | ... |

FIG.12

504 DESTINATION LIST MANAGEMENT TABLE

| TRANSMISSION SOURCE TERMINAL (TERMINAL ID) | DESTINATION TERMINAL (TERMINAL ID) |
|---|---|
| XTK0001 | XTK0002, XTK0003, XTK0004, ··· ···, XOS001, XOS002, ··· |
| XTK0002 | XTK0001, XTK0003, XTK0004, ··· ···, XOS001, XOS002, ··· |
| XTK0003 | XTK0001, XTK0002, XTK0004, ··· ···, XOS001, XOS002, ··· |
| ⋮ | ⋮ |
| XOS0001 | XOS0002, XOS0003, XOS0004, ··· ···, YOS001, YOS002, ··· |
| XOS0002 | XOS0001, XOS0003, XOS0004, ··· ···, YOS001, YOS002, ··· |
| XOS0003 | XOS0001, XOS0002, XOS0004, ··· ···, YOS001, YOS002, ··· |
| ⋮ | ⋮ |
| YOS0001 | YOS0002, YOS0003, YOS0004, ··· ···, XTJ001, XTJ002, ··· |
| YOS0002 | YOS0001, YOS0003, YOS0004, ··· ···, XTJ001, XTJ002, ··· |
| YOS0003 | YOS0001, YOS0002, YOS0004, ··· ···, XTJ001, XTJ002, ··· |
| ⋮ | ⋮ |

FIG.14

| | | |
|---|---|---|
| DESTINATION LIST | | |
| ONLINE (TRANSMISSION IS POSSIBLE) | XTK0002 | X COMPANY TOKYO HEAD OFFICE TERMINAL 2 |
| OFFLINE | XTK0003 | X COMPANY TOKYO HEAD OFFICE TERMINAL 3 |
| ONLINE (TRANSMISSION IS POSSIBLE) | XTK0004 | X COMPANY TOKYO HEAD OFFICE TERMINAL 4 |
| ONLINE (BUSY) | XTK0005 | X COMPANY TOKYO HEAD OFFICE TERMINAL 5 |
| OFFLINE | XTK0006 | X COMPANY TOKYO HEAD OFFICE TERMINAL 6 |
| OFFLINE | XTK0007 | X COMPANY TOKYO HEAD |

FIG.17

600 REDUCTION REQUEST HISTORY MANAGEMENT TABLE

(a)

| SESSION ID | DATA ID | REDUCTION REQUEST SOURCE TERMINAL ID (CAUSE INFORMATION) |
|---|---|---|
| s0001 | XTK0011A | - |
| s0002 | XTK0012V | - |
| s0003 | XOS0021A | - |
| s0004 | XOS0022V | - |
| s0005 | YOS0031A | - |
| s0006 | YOS0032V | - |
| ⋮ | ⋮ | ⋮ |

600 REDUCTION REQUEST HISTORY MANAGEMENT TABLE

(b)

| SESSION ID | DATA ID | REDUCTION REQUEST SOURCE TERMINAL ID (CAUSE INFORMATION) |
|---|---|---|
| s0001 | XTK0011A | - |
| s0002 | XTK0012V | - |
| s0003 | XOS0021A | XTK0001 (Network) |
| s0004 | XOS0022V | - |
| s0005 | YOS0031A | XOS0002 (Network), XTK0003 (CPU) |
| s0006 | YOS0032V | - |
| ⋮ | ⋮ | ⋮ |

| PRIORITY | RECEPTION DATA ID | LAST OUTPUT TIME | RECEPTION STATE | CAUSE OF STOPPING RECEPTION |
|---|---|---|---|---|
| 1 | NY0011A | 1234*** | RECEPTION IS REQUIRED | - |
| 2 | NY0012V | 1234*** | RECEPTION IS REQUIRED | - |
| 3 | WA0021A | 1234*** | RECEPTION IS REQUIRED | - |
| 4 | OS0031A | 1234*** | RECEPTION IS REQUIRED | - |
| 5 | OS0032V | 1234*** | RECEPTION IS REQUIRED | - |
| - | WA0022V | - | RECEPTION IS NOT REQUIRED | - |

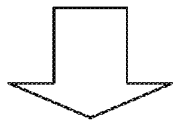

(e)

| PRIORITY | RECEPTION DATA ID | LAST OUTPUT TIME | RECEPTION STATE | CAUSE OF STOPPING RECEPTION |
|---|---|---|---|---|
| 1 | NY0011A | 1234*** | RECEPTION IS REQUIRED | - |
| 2 | NY0012V | 1234*** | RECEPTION IS REQUIRED | - |
| 3 | WA0021A | 1234*** | RECEPTION IS REQUIRED | - |
| 4 | OS0031A | 1234*** | RECEPTION IS REQUIRED | - |
| 5 | OS0032V | 1234*** | RECEPTION IS STOPPED | NY0012V ☆ |
| - | WA0022V | - | RECEPTION IS NOT REQUIRED | - |

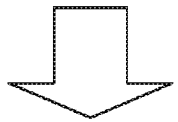

(f)

| PRIORITY | RECEPTION DATA ID | LAST OUTPUT TIME | RECEPTION STATE | CAUSE OF STOPPING RECEPTION |
|---|---|---|---|---|
| 1 | NY0011A | 1234*** | RECEPTION IS REQUIRED | - |
| 2 | NY0012V | 1234*** | RECEPTION IS REQUIRED | - |
| 3 | WA0021A | 1234*** | RECEPTION IS REQUIRED | - |
| 4 | OS0031A | 1234*** | RECEPTION IS STOPPED | NY0012V ☆ |
| 5 | OS0032V | 1234*** | RECEPTION IS STOPPED | NY0012V |
| - | WA0022V | - | RECEPTION IS NOT REQUIRED | - |

| DESTINATION TERMINAL ID | TRANSMISSION DATA ID | TRANSMISSION STATE |
|---|---|---|
| TK0001 | NY0011A | TRANSMISSION IS ENABLED |
| TK0001 | NY0012V | TRANSMISSION IS ENABLED |
| TK0001 | OS0031A | TRANSMISSION IS ENABLED |
| TK0001 | OS0032V | TRANSMISSION IS DISABLED |
| TK0001 | WA0021A | TRANSMISSION IS ENABLED |
| TK0001 | WA0022V | TRANSMISSION IS DISABLED |
| ... | ... | ... |

(d) 36

| DESTINATION TERMINAL ID | TRANSMISSION DATA ID | TRANSMISSION STATE |
|---|---|---|
| TK0001 | NY0011A | TRANSMISSION IS ENABLED |
| TK0001 | NY0012V | TRANSMISSION IS ENABLED |
| TK0001 | OS0031A | TRANSMISSION IS DISABLED |
| TK0001 | OS0032V | TRANSMISSION IS DISABLED |
| TK0001 | WA0021A | TRANSMISSION IS ENABLED |
| TK0001 | WA0022V | TRANSMISSION IS DISABLED |
| ... | ... | ... |

(e) 36

| DESTINATION TERMINAL ID | TRANSMISSION DATA ID | TRANSMISSION STATE |
|---|---|---|
| TK0001 | NY0011A | TRANSMISSION IS ENABLED |
| TK0001 | NY0012V | TRANSMISSION IS ENABLED |
| TK0001 | OS0031A | TRANSMISSION IS ENABLED |
| TK0001 | OS0032V | TRANSMISSION IS DISABLED |
| TK0001 | WA0021A | TRANSMISSION IS ENABLED |
| TK0001 | WA0022V | TRANSMISSION IS DISABLED |
| ... | ... | ... |

(f) 36

| DESTINATION TERMINAL ID | TRANSMISSION DATA ID | TRANSMISSION STATE |
|---|---|---|
| TK0001 | NY0011A | TRANSMISSION IS ENABLED |
| TK0001 | NY0012V | TRANSMISSION IS ENABLED |
| TK0001 | OS0031A | TRANSMISSION IS ENABLED |
| TK0001 | OS0032V | TRANSMISSION IS ENABLED |
| TK0001 | WA0021A | TRANSMISSION IS ENABLED |
| TK0001 | WA0022V | TRANSMISSION IS DISABLED |
| ... | ... | ... |

FIG.22

(g) PRIORITY DATA

| | PRIORITY | RECEPTION DATA ID | LAST OUTPUT TIME | RECEPTION STATE | CAUSE OF STOPPING RECEPTION |
|---|---|---|---|---|---|
| | 1 | NY0011A | 1234*** | RECEPTION IS REQUIRED | - |
| | 2 | NY0012V | 1234*** | RECEPTION IS REQUIRED | - |
| | 3 | WA0021A | 1234*** | RECEPTION IS REQUIRED | - |
| | 4 | OS0031A | 1234*** | RECEPTION IS STOPPED | NY0012V |
| | 5 | OS0032V | 1234*** | RECEPTION IS STOPPED | NY0012V |
| | - | WA0022V | - | RECEPTION IS NOT REQUIRED | - |

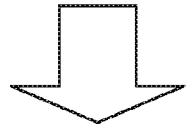

(h) PRIORITY DATA

| | PRIORITY | RECEPTION DATA ID | LAST OUTPUT TIME | RECEPTION STATE | CAUSE OF STOPPING RECEPTION | |
|---|---|---|---|---|---|---|
| | 1 | NY0011A | 1234*** | RECEPTION IS REQUIRED | - | |
| | 2 | NY0012V | 1234*** | RECEPTION IS REQUIRED | - | |
| | 3 | WA0021A | 1234*** | RECEPTION IS REQUIRED | - | |
| | 4 | OS0031A | 1234*** | RECEPTION IS REQUIRED | - | ☆ |
| | 5 | OS0032V | 1234*** | RECEPTION IS STOPPED | NY0012V | |
| | - | WA0022V | - | RECEPTION IS NOT REQUIRED | - | |

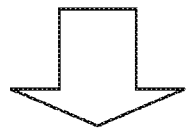

(i) PRIORITY DATA

| | PRIORITY | RECEPTION DATA ID | LAST OUTPUT TIME | RECEPTION STATE | CAUSE OF STOPPING RECEPTION | |
|---|---|---|---|---|---|---|
| | 1 | NY0011A | 1234*** | RECEPTION IS REQUIRED | - | |
| | 2 | NY0012V | 1234*** | RECEPTION IS REQUIRED | - | |
| | 3 | WA0021A | 1234*** | RECEPTION IS REQUIRED | - | |
| | 4 | OS0031A | 1234*** | RECEPTION IS REQUIRED | - | |
| | 5 | OS0032V | 1234*** | RECEPTION IS REQUIRED | - | ☆ |
| | - | WA0022V | - | RECEPTION IS NOT REQUIRED | - | |

DATA TRANSMISSION SYSTEM, A TERMINAL DEVICE, AND A RECORDING MEDIUM

FIELD

The present invention relates to a data transmission system, a terminal device, and a recording medium.

BACKGROUND

Conventionally, a teleconference system used for sharing video and audio among a plurality of bases connected via a communication network to hold a conference has been provided. However, in the conventional system, there is a problem in that degradation of sound and image quality often occurs, due to deterioration in the communication state of the communication network. The degradation of sound and image quality causes huge stress on the parts participants of the conference, and if the degradation is too severe, it is not possible to continue the conference.

In relation to this point, Japanese Patent Application Laid-open No. 2010-093505 (Patent Literature 1) discloses a communication system that increases the ratio of bandwidth for audio communication as compared with bandwidth for image communication in response to deterioration in the communication state of the communication network, to prevent degradation of sound quality so as to enable the participants of the conference to at least mutually understand what the other has said in any case.

However, the degradation of sound and image quality occurs not only by the transmission delay of the communication network, but also occurs substantially due to the internal processing delay (processing time from when data is received to when an output signal is generated) at the data receiving side. Thus, an expected effect, may not be obtained by just focusing on the communication state of the communication network as in Patent Literature 1.

SUMMARY

Technical Problem

The present invention has been made in view of the problem in the conventional technology described above, and an object of the present invention is to provide a new data transmission system that can output high priority data while keeping the quality as high as possible, regardless of the cause of degradation of output quality.

Solution to Problem

The inventors of the present invention have diligently studied the configuration of the data transmission system that can output high priority data while keeping the quality as high as possible, regardless of the cause of degradation of output quality, found the following configuration, and reached this invention.

That is, the present invention has a feature of a data transmission system including a plurality of terminal devices arranged in a communication network and configured to transmit or receive content data. At least one terminal device configured to receive content data transmitted from another terminal device, among the plurality of terminal devices, includes a reception priority management unit and a data reception control unit. The reception priority management unit is configured to manage priority of two or more content data addressed to the own terminal device. The data reception control unit is configured to, based on an output time interval of output signals corresponding to priority data whose priority managed by the reception priority management unit is high among two or more content data being received, request a transmission source configured to transmit content data having priority lower than the priority data, to perform control to stop transmitting the content data.

Advantageous Effects of Invention

As described above, according to the present invention, it is possible to output high priority data while keeping the quality as high as possible, regardless of the cause of degradation of output quality.

BRIEF DESCRIPTION OF DRAWINGS

FIG. 8 is a diagram illustrating a reception data management table according to the present embodiment.

FIG. 9 is a functional block diagram of the transmission management device of the present embodiment.

FIG. 10 is a diagram illustrating a terminal authentication management table according to the present embodiment.

FIG. 11 is a diagram illustrating a terminal management table according to the present embodiment.

FIG. 12 is a diagram illustrating a destination list management table according to the present embodiment.

FIG. 14 is a diagram illustrating a destination list according to the present embodiment.

FIG. 17 is a diagram illustrating a reduction request history management table according to the present embodiment.

FIG. 20 is a diagram illustrating the reception data management table according to the present embodiment.

FIG. 21 is a diagram illustrating the relay data management table according to the present embodiment.

FIG. 22 is a diagram illustrating the reception data management table according to the present embodiment.

DESCRIPTION OF EMBODIMENTS

Figure 1:
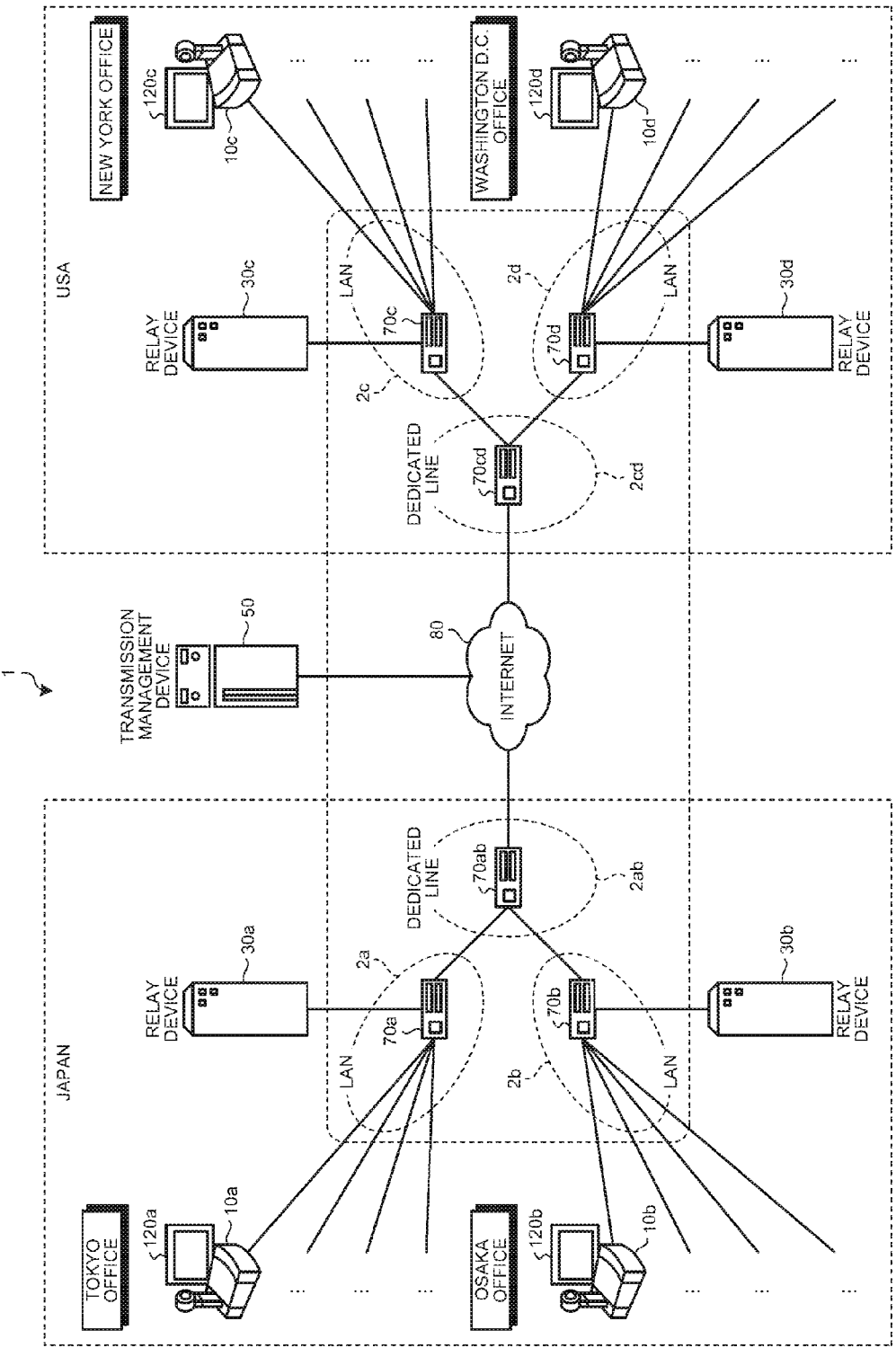
FIG. 1 is a communication network diagram of a teleconference system of a present embodiment.

Hereinafter, the present invention will be described with reference to an embodiment. It is to be understood that the present invention is not limited to the following embodiment. In the drawings referred to in the following description, the same reference numerals denote the same components, and the description thereof is omitted as appropriate.

In the following, a data transmission system of the present invention will be described based on the preferred application of a "teleconference system".

FIG. 1 illustrates a communication network configuration of a teleconference system 1 of an embodiment of the present invention. As illustrated in FIG. 1, in the teleconference system 1 of the present embodiment, four bases (Tokyo office, Osaka office, New York office, and Washington D.C. office) are connected via a communication network.

The teleconference system 1 of the present embodiment includes a plurality of terminal devices 10 (10a, 10b, 10c, 10d a plurality of relay devices 30 (30a, 30b 30c, and 30d), and a transmission management device 50. Each of the terminal devices 10 is an information processing device that acquires video and audio of the base being installed, and transmits the video and audio to the terminal devices 10 in the other bases. The terminal device 10 also receives video and audio of the other bases from the terminal device 10 installed in each of the bases, and outputs the video and audio. Each of the relay devices 30 is an information processing device that is interposed between the terminal devices 10, and that relays content data. The transmission management device 50 is an information processing device that centrally manages processes (such as login authentication of the terminal device and monitoring communication state of the communication network) required for operating the system and various types of management information.

A local area network (LAN) 2a constructed in the Tokyo office includes a router 70a, and the terminal device 10a installed in the Tokyo office is connected to the LAN 2a via the router 70a. Similarly, a LAN 2b constructed in the Osaka office includes a router 70b, and the terminal device 10b installed in the Osaka office is connected to the LAN 2b via the router 70b. Further, the LAN 2a and the LAN 2b are connected to a dedicated line 2ab that includes a router 70ab.

A LAN 2c constructed in the New York office includes a router 70c, and the terminal device 10c installed in the New York office is connected to the LAN 2c via the router 70c. Similarly, a LAN 2d constructed in the Washington D.C. office includes a router 70d, and the terminal device 10d installed in the Washington D.C. office is connected to the LAN 2d via the router 70d. Further, the LAN 2c and the LAN 2d are connected to a dedicated line 2cd that includes a router 70cd.

In this example, the dedicated line 2ab in Japan and the dedicated line 2cd in the US are respectively connected to the Internet 80 via the router 70ab and the router 70cd. The transmission management device 50 is communicably connected to the terminal devices 1 and the relay devices 30 via the Internet 80. The optimal path for content data (image data and audio data) is selected through the routers (70a, 70b, 70c, 70d, 70ab, and 70cd) described above. The dedicated line may be shared, instead of being dedicated. It is also possible to connect directly to the Internet without using the dedicated line.

In the present embodiment, a session $S_i$ for managing information is established between the terminal devices 10 via the transmission management device 50, and the terminal devices 10 mutually transmit and receive various types of management information using the session $S_i$.

In the present embodiment, a session $S_d$ for data is established between the terminal devices 10 via the relay device 30, and the terminal devices 10 mutually transmit and receive content data using the session $S_d$. In this example, each of the terminal devices 10 is configured so as to transmit a plurality of content data at the same time, and each data is transmitted by the specific session $S_d$ that is established separately. In the present embodiment, for example, image data (moving image/still image) and audio data may be transmitted at the same time. Also, a plurality of image data with different resolutions (high resolution, middle resolution, and low resolution) may be transmitted at the same time. The content data may also include text data.

In the above, the communication network configuration of the teleconference system 1 of the present embodiment has been briefly described. Next, the devices included in the teleconference system 1 will be described.

Figure 2:
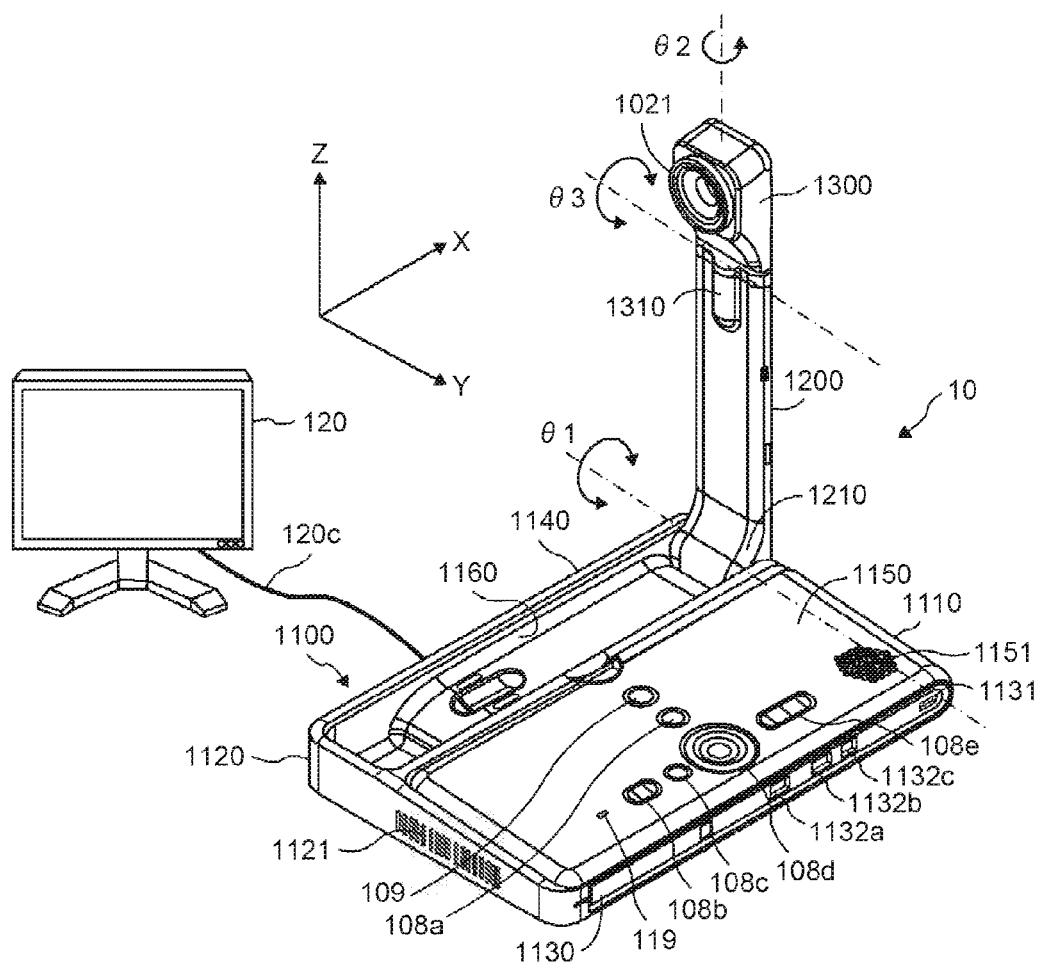
FIG. 2 is an external view of a terminal device of the present embodiment.

First, the configuration of the terminal device 10 of the present embodiment will be described. FIG. 2 is an external view of the terminal device 10 of the present embodiment. It is to be noted that the external view illustrated in FIG. 2 is merely an example. As illustrated in FIG. 2, the terminal device 10 includes a casing 1100, an arm 1200, and a camera housing 1300. An air intake surface (not illustrated) formed of a plurality of air intake holes is provided on a front side wall surface 1110 of the casing 1100. An air discharge surface 1121 formed of a plurality of air discharge holes is provided on a rear side wall surface 1120 of the casing 1100. Thus, the outside air at the rear of the terminal device 10 is taken in through the air intake surface (not illustrated), and is discharged to the rear of the terminal device 10 through the air discharge surface 1121, by driving a cooling fan built in the casing 1100. A sound collecting hole 1131 for collecting sound is formed on a right side wall surface 1130 of the casing 1100, and the sound of a conference is collected by a built-in microphone (will be described below), through the sound collecting hole 1131.

An operation panel 1150 is formed at the side of the right side wall surface 1130 of the casing 1100. The operation panel 1150 includes a plurality of operation buttons (108a to 108e), which will be described below, a power source switch 109, which will be described below, and an alarm lamp 119. The operation panel 1150 also includes a sound output surface 1151 formed of a plurality of sound output holes, through which the output sound from a built-in speaker 115, which will be described below, is passed. An accommodating unit 1160 in a concave shape to accommodate the arm 1200 and the camera housing 1300 is formed at the side of a left side wall surface 1140 of the casing 1100. A plurality of connection ports (1132a to 1132c) each used to electrically connect a cable with an external connection device interface (I/F) 119, which will be described below, are provided on the right side wall surface 1130 of the casing 1100. A connection port (not illustrated) used to connect a cable 120c for a display 120 with the external connection device I/F 119, which will be described below, is provided on the left side wall surface 1140 of the casing 1100.

The arm 1200 is mounted on the casing 1100 via a torque hinge 1210, and the arm 1200 is rotatable in the vertical direction relative to the casing 1100, within a range of a tilt angle θ1 of 135 degrees. FIG. 2 illustrates the state when the tilt angle θ1 is 90 degrees.

A built-in camera (will be described below) is installed in the camera housing 1300, and the built-in camera captures images of the conference. The camera housing 1300 is mounted on the arm 1200 via a torque hinge 1310, and the camera housing 1300 is rotatable in the vertical and horizontal directions relative to the arm 1200, within a range of a pan angle θ2 of ±180 degrees as well as within a range of a tilt angle θ3 of ±45 degrees, when the state illustrated in FIG. 2 is 0 degrees.

The external view of the terminal device 10 of the present embodiment has been described as above. Next, a hardware configuration of the terminal device 10 will be described.

Figure 3:
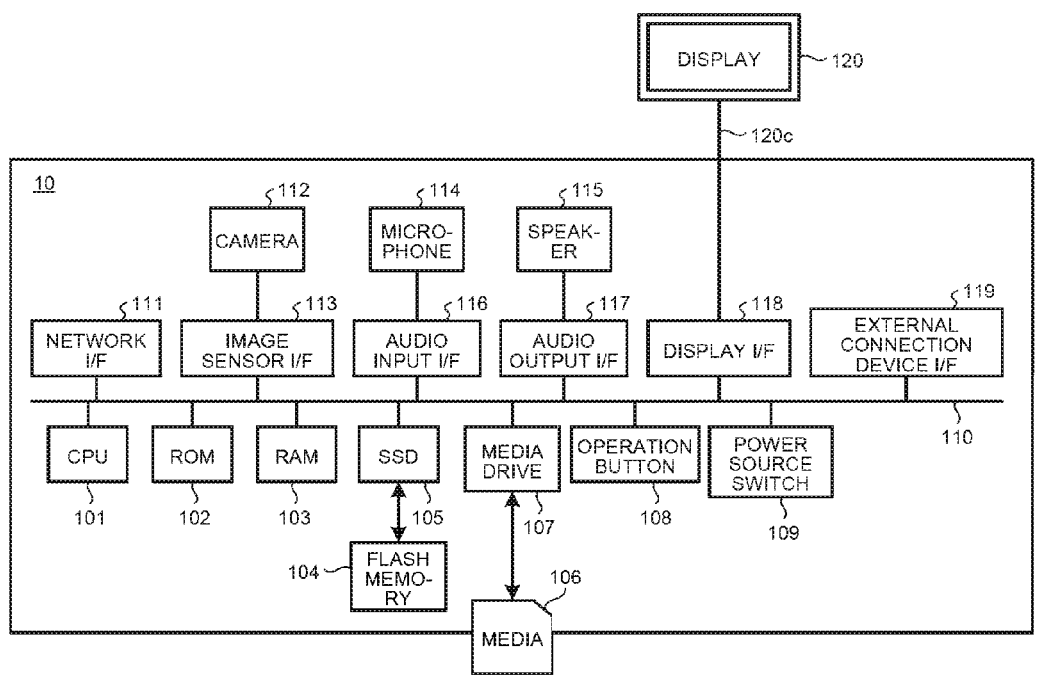
FIG. 3 is a hardware configuration diagram of the terminal device of the present embodiment.

FIG. 3 is a hardware configuration diagram of the terminal device 10 of the present embodiment. As illustrated in FIG. 3, the terminal device 10 includes a central processing unit (CPU) 101 that controls the overall operation of the device, a read-only memory (ROM) 102 that stores therein computer programs such as an initial program loader (IPL) for driving the CPU 101, a random-access memory (RAM) 103 that is used as a work area of the CPU 101, a flash memory 104 that stores therein various types of data such as a computer program for a terminal, image data, and audio data, and a solid state disk (SSD) 105 that controls reading and writing of various types of data from and to the flash memory 104 according to the control of the CPU 101. The terminal device 10 also includes a media drive 107 that controls reading and writing data from and to a recording media 106 such as a flash memory, an operation button 108 operated to select a destination of the terminal device 10 and the like, the power source switch 109 that switches ON/OFF of the power source of the terminal device 10, a communication network I/F 111 that transmits data using a communication network, and a bus line 110 such as an address bus and a data bus that connects the structural components.

The terminal device 10 also includes a built-in camera 112 including a lens optical system and a solid-state image sensor (such as a complementary metal oxide semiconductor (CMOS) and a charge-coupled device (CCD)) as an image input device for capturing images of the conference and acquiring image data. An image sensor I/F 113 controls driving of the camera 112.

An external display 120 is connected to the terminal device 10 as an image output device. The display 120 displays images of the conference of the other bases, an operation input screen, and the like, based on image signals (such as video graphics array (VGA) signals, high-definition multimedia interface (HDMI) (registered trademark) signals, and digital video interface (DVI) signals) output from a display I/F 118. The display may also be built in.

The terminal device 10 also includes a built-in microphone 114 as an audio input device, and an audio input I/F 116 controls the input of audio signals from the microphone 114. The terminal device 10 further includes the built-in speaker 115 as an audio output device, and the speaker 115 outputs the sound of the conference of the other bases, based on the audio signals output from an audio output I/F 117.

The external connection device I/F 119 for connecting various external devices can connect an external device such as an external camera, an external microphone, and an external speaker via a universal serial bus (USB) cable and the like. In the present embodiment, the external camera when connected is driven preferentially over the built-in camera 112, and the external microphone or the external speaker when connected is driven preferentially over the built-in microphone 114 and the built-in speaker 115. Alternatively, all of the camera, the speaker, and the microphone can only be mounted externally.

The hardware configuration of the terminal device 10 of the present embodiment has been described as above. Next, hardware configurations of the relay device and the transmission management device 50 according to the present embodiment will be described. The relay device 30 and the transmission management device 50 are both versatile information processing devices referred to as a Web server. Thus, in the following, the hardware configurations of the relay device 30 and the transmission management device 50 will be collectively described.

Figure 4:
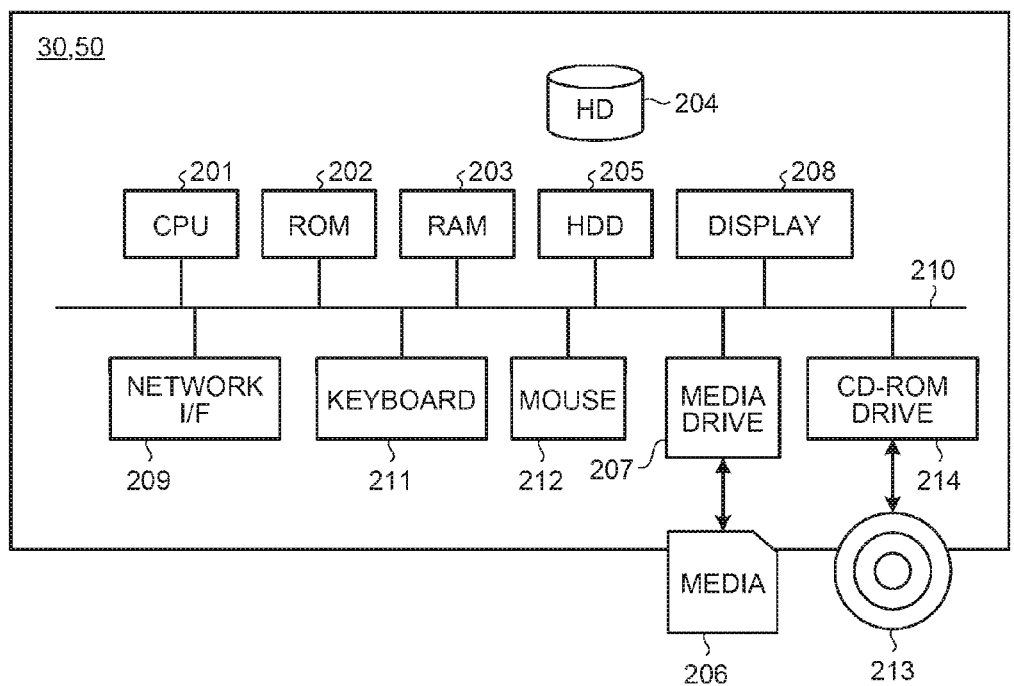
FIG. 4 is a hardware configuration diagram of an information processing device (a relay device and a transmission management device) of the present embodiment.

FIG. 4 is a hardware configuration diagram of the information processing device (the relay device 30 and the transmission management device 50) of the present embodiment. As illustrated in FIG. 4, the information processing devices 30 and 50 of the present embodiment include a CPU 201 that controls the overall operation of the device, a ROM 202 that stores therein computer programs such as the IPL for driving the CPU 201, a RAM 203 that is used as a work area of the CPU 201, a hard disk (HD) 204 that stores therein various types of data (such as a data relaying program and a transmission management program), and a hard disk drive (HDD) 205 that controls reading and writing various types of data from and to the HD 204 according to the control of the CPU 201. The information processing devices 30 and 50 also include a media drive 207 that controls reading and writing data from and to a recording media 206 such as a flash memory, a display 208 that displays various types of information, a communication network I/F 209 that transmits data via a communication network such as the LAN and the Internet, a keyboard 211 and a mouse 212 as an input device, a compact disc-read only memory (CD-ROM) drive 214 that controls reading and writing various types of data from and to a CD-ROM 213, and a bus line 210 such as an address bus and a data bus that connects the structural components described above.

The hardware configurations of the terminal device 10, the relay device 30, and the transmission management device 50 of the present embodiment have been described above. Next, functional blocks of the devices will now be described.

Figure 5:
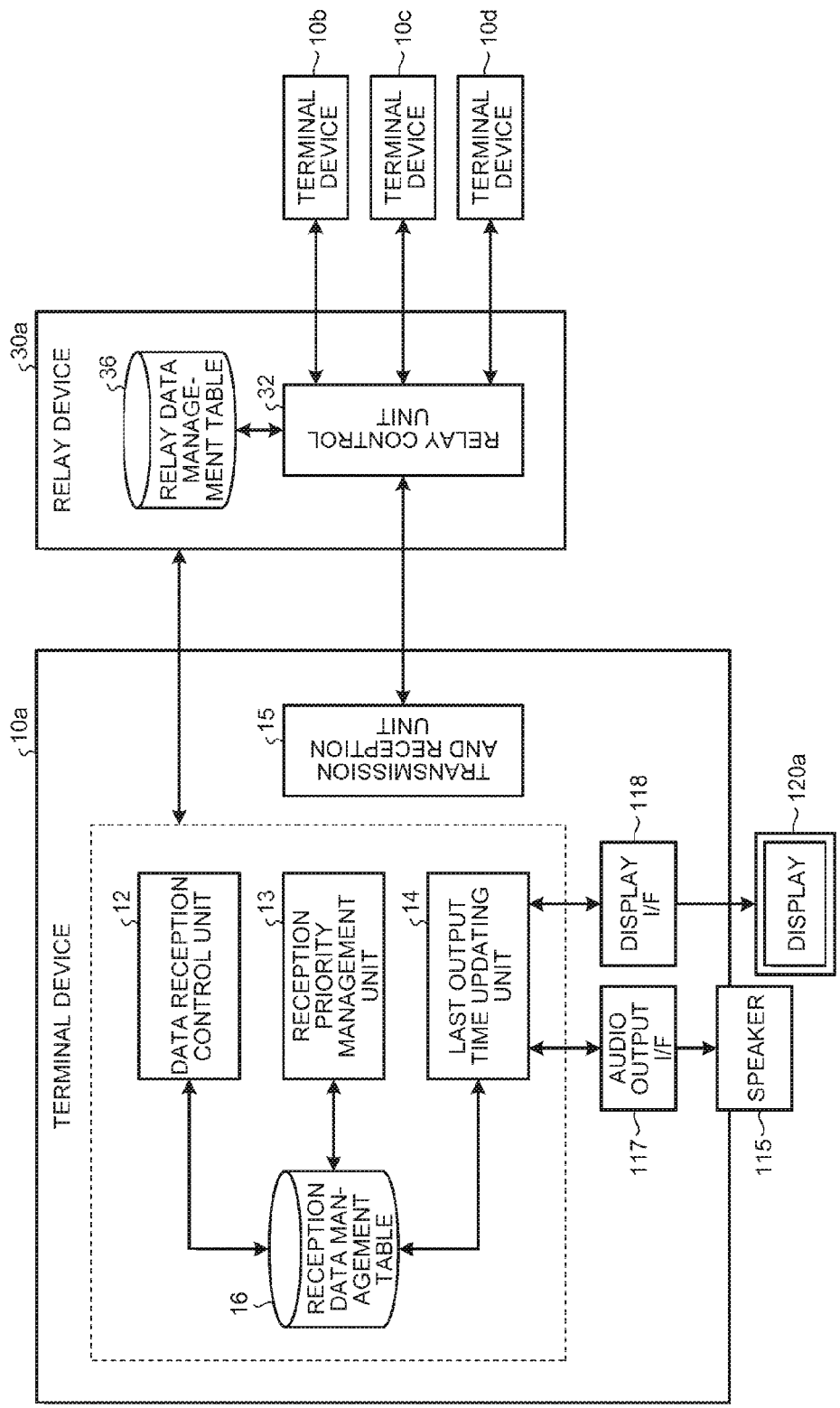
FIG. 5 is a functional block diagram of the terminal device and the relay device of the present embodiment.

FIG. 5 illustrates functional blocks of the terminal device 10 and the relay device 30 of the present embodiment. As illustrated in FIG. 5, in the present embodiment, content data is transmitted and received between a transmission and reception unit 15 of the terminal device 10a and a relay control unit 32 of the relay device 30a. In the present embodiment, functional units of a data reception control unit 12, a reception priority management unit 13, and a last output time updating unit 14 that are executed by a predetermined computer program cooperatively control the reception state of the content data in the terminal device 10a.

In the following, the contents of the specific process executed by the functional units illustrated in FIG. 5 will be described based on the scenario in which the terminal device 10a, the terminal device 10b, the terminal device 10c and the terminal device 10d respectively installed in the Tokyo office, the Osaka office, the New York office, and the Washington D.C. office illustrated in FIG. 1 transmit and receive two types of content data (image data and audio data) with the terminal devices 10 (three bases) excluding the subject terminal device 10. In the following explanation, reference will be made to FIG. 5 as needed.

In the teleconference system 1 of the present embodiment, the user creates an account in the present system, and also registers content data to be transmitted in the transmission management device 50. At this time, the transmission management device 50 assigns an identifier that uniquely identifies a terminal in the system (hereinafter, referred to as a terminal ID) and an identifier that uniquely identifies content data in the system (hereinafter, referred to as a data ID) to the terminal device 10.

Further, in the teleconference system 1 of the present embodiment, the user requests the opposite party with whom a teleconference is to be held of an approval in advance, via the transmission management device 50. At this point, each of the terminal devices 10 acquires the terminal ID of the terminal device 10 of the opposite party, from the transmission management device 50.

[A Generation Example of a Reception Data Management Table (1)]

Figure 6:
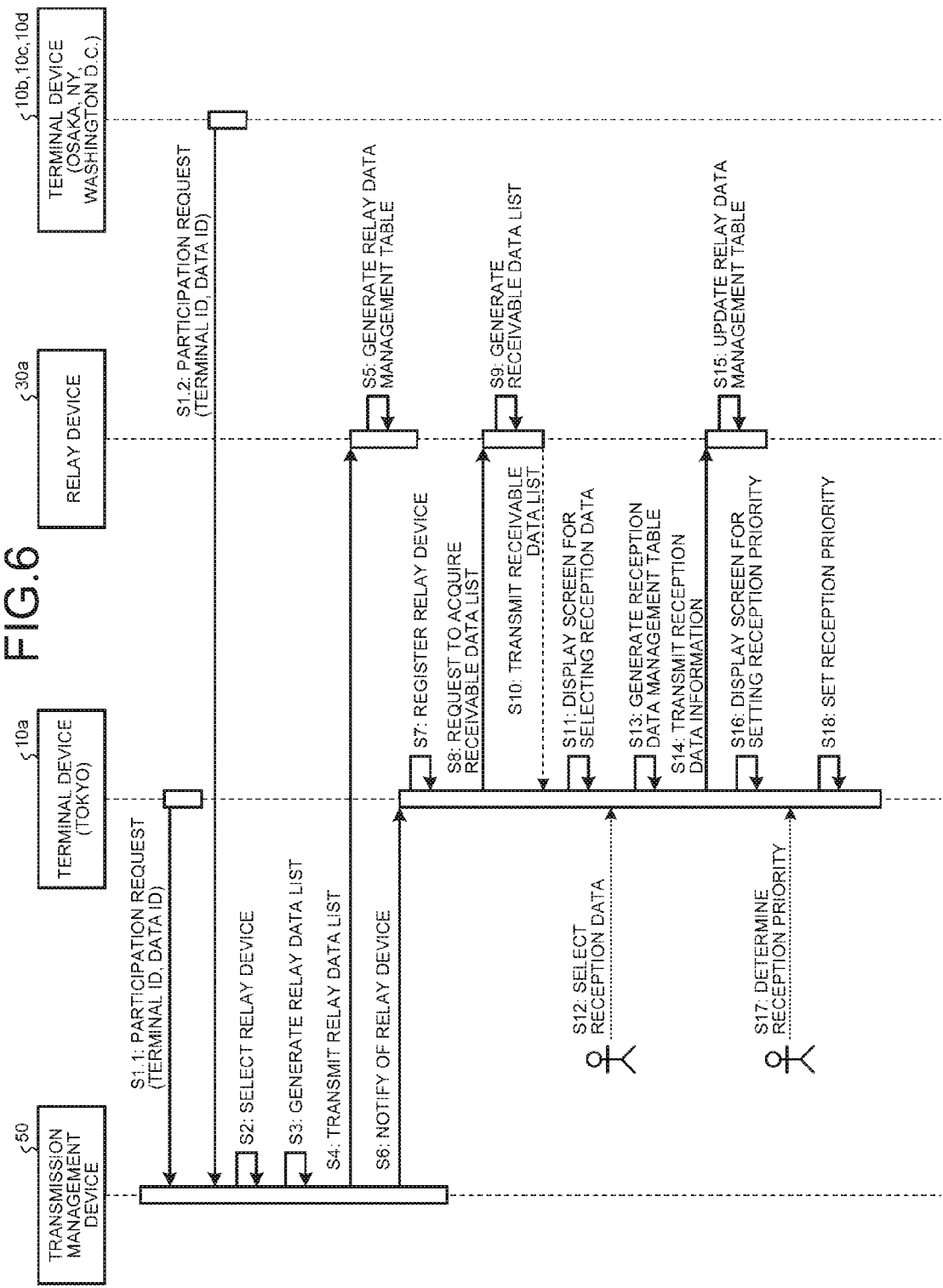
FIG. 6 is a sequence diagram illustrating a generation procedure of a reception data management table.

Under the conditions described above, in the present embodiment, the terminal device 10 generates a reception data management table before starting the teleconference. Hereinafter, a generation procedure of the reception data management table will be described based on the sequence diagram illustrated in FIG. 6. In the following, the explanation is given while focusing on the terminal device 10a installed in the Tokyo office.

When a user of the Tokyo office successfully logs into the teleconference system 1, the reception priority management unit 13 of the terminal device 10a displays an input screen for inputting content data the user wishes to transmit (hereinafter, referred to as data) and the destination thereof, on a display 120a. The user selects the content data the user wishes to transmit and the destination thereof, via the input screen.

Consequently, the reception priority management unit 13 generates a participation request including the terminal ID of the terminal device 10a, the data ID of the data to be transmitted (data ID "TKS0001A" of the audio data and data ID "TKS0002V" of the image data), and the terminal IDs of the terminal devices 10 (10b, 10c, and 10d) that are the destinations of the data. The reception priority management unit 13 then transmits the participation request to the transmission management device 50 (S1.1). Then, similarly, each of the terminal devices 10 (10b, 10c, and 10d) of the other bases (Osaka office, New York office, and Washington D.C. office) transmits a participation request including the terminal ID of the subject terminal device 10, the data ID of the data to be transmitted, and the terminal ID of the destination, to the transmission management device 50 (S1.2).

The transmission management device 50 that has received the participation requests from the terminal devices 10 of the bases selects an optimal relay device 30 for relaying data addressed to each base, based on the IP address of each device calculated from the terminal ID included in the participation request (S2). In the example illustrated in FIG. 1, the relay device 30a is selected as the device that is in charge of relaying data addressed to the terminal device 10a of the Tokyo office. Then, similarly, the relay device 30a, the relay device 30b, or the relay device 30c is selected as the device that is in charge of relaying data addressed to the Osaka office, the New York office, or the Washington D.C. office, respectively.

The transmission management device 50 generates a list of relay data (hereinafter, referred to as a relay data list) that is covered by the relay device 30a (S3), and transmits the generated relay data list to the relay device 30a (S4). The relay data list includes the terminal ID of the terminal device 10a of the Tokyo office, and the data ID of the data addressed to the terminal device 10a.

The relay device 30a generates a relay data management table, based on the relay data list received from the transmission management device 50 (S5). The relay data management table is a table used by the relay device 30a for controlling the data relay. The relay data management table has three column fields to store the "destination terminal ID", the "transmission data ID", and the "transmission state". At S5, the terminal ID of the terminal device 10 that is the destination of the relay data covered by the relay device 30a is stored in the "destination terminal ID" field. The data ID of the data addressed to the terminal device 10 is stored in the "transmission data ID" field.

FIG. 7(a) illustrates a relay data management table 36 generated at this point. In the example illustrated in FIG. 7(a), the terminal ID "TK0001" of the terminal device 10a is stored in the "destination terminal ID" field. The data ID "NY0011A" of the audio data of the New York office, the data ID "NY0012V" of the image data of the New York office, the data ID "OS0031A" of the audio data of the Osaka office, the data ID "OS0032V" of the image data of the Osaka office, the data ID "WA0021A" of the audio data of the Washington D.C. office, and the data ID "WA0022V" of the image data of the Washington D.C. office are sequentially stored from the top line.

Next, the transmission management device 50 notifies the terminal device 10a of the Tokyo office of the relay device 30a (IP address) that covers the data relay (S6). Consequently, the terminal device 10a registers the relay device 30a as the device that is in charge of relaying the terminal device 10a (S7).

Next, the reception priority management unit 13 of the terminal device 10a requests the relay device 30a of a list of receivable data (hereinafter, referred to as a receivable data list) (S8). More specifically, the reception priority management unit 13 generates a receivable data list acquisition request including the own terminal ID "TK0001", and transmits the receivable data list acquisition request to the relay device 30a.

Consequently, the relay device 30a searches the relay data management table 36 illustrated in FIG. 7(a), using the terminal ID "TK0001" included in the receivable data list acquisition request as a key, and generates a list (receivable data list) of data ID of the data addressed to the terminal device 10a (S9). The relay device 30a then transmits the receivable data list to the terminal device 10a (S10).

The reception priority management unit 13 of the terminal device 10a generates an input screen for selecting data the user wishes to receive, based on the receivable data list acquired from the relay device 30a, and display the input screen on the display 120a (S11). In this example, the names of six data ("New York:image", "New York:audio", "Washington D.C.:image", "Washington D.C.:audio", "Osaka:image" and "Osaka:audio") are displayed on the screen in a selectable manner.

The user selects data the user wishes to receive via the input screen (S12). Consequently, the reception priority management unit 13 generates the reception data management table (S13). The reception data management table is a table used by the terminal device 10a for controlling the reception of data. A reception data management table 16 has five column fields to store the "priority", the "reception data ID", the "last output time", the "reception state", and the "cause of stopping the reception".

FIG. 8(a) illustrates the reception data management table 16 generated when the user of the Tokyo office has selected the data the user wishes to receive. In the example illustrated in FIG. 8(a), six data IDs (the data ID "NY0011A" of the audio data of the New York office, the data ID "NY0012V" of the image data of the New York office, the data ID "OS0031A" of the audio data of the Osaka office, the data ID "OS0032V" of the image data of the Osaka office, the data ID "WA0021A" of the audio data of the Washington D.C. office, and the data ID "WA0022V" of the image data of the Washington D.C. office) included in the receivable data list acquired at 810 are stored in the "reception data ID" field.

The status on the reception of each data is stored in the "reception state" field. More specifically, "reception is required" is set as a status in the "reception state" field for the data selected by the user, and "reception is not required" is set as a status in the "reception state" field for the data not selected by the user. In the example illustrated in FIG. 8(*a*), the "reception is not required" is set in the "reception state" field of the image data of the Washington D.C. office, and the "reception is required" is set in all other "reception state" fields. Thus, it can be seen that the user of the Tokyo office wishes to receive five data ("New York:image" "New York:audio", "Washington D.C.:audio", "Osaka:image", and "Osaka:audio").

As soon as the user selects the reception data, the reception priority management unit 13 generates "reception data information" including the values of the "reception data ID" field and the "reception state" field in the reception data management table 16, as well as the own terminal ID. The reception priority management unit 13 then transmits the "reception data information" to the relay device 30*a* (S14). Consequently, the relay device 30*a* updates the relay data management table 36 (S15). More specifically, the relay device 30*a* searches the "destination terminal ID" field and the "relay data ID" field in the relay data management table 36, using the terminal ID and the data ID included in the received reception data information as keys, and specifies the corresponding relay data. As for the data with the "reception is required", the relay device 30*a* sets the "transmission is enabled" the "transmission state" field. As for the data with the "reception is not required", the relay device 30*a* sets the "transmission is disabled" in the "transmission state" field.

Figure 7:
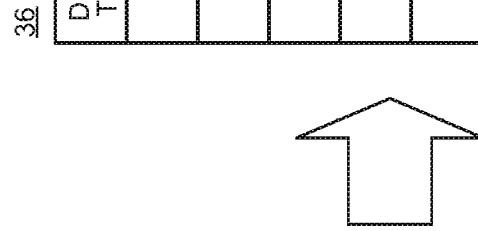
FIG. 7 is a diagram illustrating a relay data management table according to the present embodiment.

FIG. 7(*b*) illustrates the relay data management table 36 after being updated at S15. As illustrated in FIG. 7(*b*), the "transmission is enabled" is set in the "transmission state" fields corresponding to the five data ("New York:image" "New York:audio", "Washington D.C.:audio", "Osaka:image", and "Osaka:audio") selected by the user. The "transmission is disabled" is set in the "transmission state" field corresponding to the data excluding the above data ("Washington D.C.:image").

Next, the reception priority management unit 13 of the terminal device 10*a* generates an input screen for setting the priority of the reception data, and displays the input screen on the display 120*a* (S16). In this example, a screen that can set the order of the names of five data ("New York:image", "New York:audio", "Washington D.C.:audio", "Osaka:image", and "Osaka:audio") is to be displayed.

The user determines the priority of receiving the five data via the input screen (S17). At this time, the user determines the priority based on the idea such as giving priority to overseas offices to local offices, or giving priority to audio data to image data.

Consequently, the reception priority management unit 13 sets the priority according to the priority order, in the "priority" field in the reception data management table 16 (S18). In this example, the "priority" is expressed by an integer equal to or more than "1", and the priority is increased by a decrease in the value. Thus, in this example, the data with higher priority has a smaller value in the "priority" field.

FIG. 8(*b*) illustrates the reception data management table 16 when the user of the Tokyo office has determined the priority of the reception data. In the example illustrated in FIG. 8(*b*), as a result of sorting the reception data in ascending order based on the priority, the lines of the audio data (ID=NY0011A) of the New York office, the image data (ID=NY0012V) of the New York office, the audio data (ID=WA0021A) of the Washington D.C. office, the audio data (ID=OS0031A) of the Osaka office, and the image data (ID=OS0032V) of the Osaka office are sequentially arranged from the top line. The "priority" field of the image data (ID=WA0022V) of the Washington D.C. office in the bottom line, the reception of which is not selected, is left blank.

The procedure of generating the reception data management table by the reception priority management unit 13 of the terminal device 10 has been described above. In the example described above, a mode in which the user directly sets the priority of the reception data has been described. However, the present invention is not limited to the embodiment described above, and for example, a computer program implemented with an algorithm for determining the priority may also be used. In this case, the user is asked a question such as "Which is given priority: local office or oversea office?" or "Which is given priority: image or audio?" using the Wizard, to prompt the user to set the conditions, and the dedicated computer program derives the priority from the set conditions to automatically set the priority. In this case, if the computer program corresponds to the condition such as to "give priority to the current speaker", a use case in which the priority changes dynamically every time the speaker changes is also possible. Also, if the participants of the conference and the priority of content data are determined in advance, the preset reception data management table may be read out at the same time the device is activated.

[A Functional Configuration of the Transmission Management Device 50]

FIG. 9 illustrates functional blocks of the transmission management device 50 of the present embodiment. As illustrated in FIG. 9, the transmission management device 50 of the present embodiment includes a transmission and reception unit 51, a terminal authentication 52, unit a terminal management unit 53, an extraction unit 54, a terminal state confirmation unit 56, a destination list management unit 57, a storage/reading processing unit 59, and a storage device 58.

The transmission and reception unit 51 performs transmission and reception of various types of data with the terminal device 10 and the relay device 30 via a network 80. The terminal authentication unit 52 searches a terminal authentication management table 500 (refer to FIG. 10) stored in the storage device 58, using the terminal ID and the password included in login request information received via the transmission and reception unit 51 as search keys, and determines whether the same pair of the terminal ID and the password are managed in the terminal authentication management table 500 to perform terminal authentication.

To manage the operation state of a request source terminal that has requested a login, the terminal management unit 53 stores and manages the terminal ID of the request source terminal, the operation state of the request source terminal, the reception date and time when the login request information is received by the transmission management device 50, and the IP address of the request source terminal in a terminal management table 502 (refer to FIG. 11) in an associated manner. When the user turns the power source switch 109 (refer to FIG. 3) of the terminal device 10 from the ON state to the OFF state, the terminal management unit 53 changes the operation state in the terminal management table 502 from online to offline, based on the operation state information to turn OFF the power source, sent from the terminal device 10.

The extraction unit 54 searches a destination list management table 504 illustrated in FIG. 12 using the terminal ID of the request source terminal that has requested a login as a key, and reads out the terminal ID of the candidate destination terminal communicable with the request source terminal to extract the terminal ID. In this example, the destination list management table 504 is a table generated based on a mutual authentication process executed in advance between the terminal devices 10 that each has an account in the teleconference system 1. The destination list management table 504 manages the terminal ID of the transmission source terminal device 10 and the terminal ID of the destination terminal device 10 that has received an approval from the transmission source terminal device 10, in an associated manner.

The extraction unit 54 searches the destination list management table 504 using the terminal ID of the request source terminal that has requested a login as a key, and extracts the terminal ID of the other request source terminal having registered the terminal ID of the request source terminal described above as a candidate destination terminal. The extraction unit 54 also searches the terminal management table 502 using the terminal ID of the candidate destination terminal extracted by the extraction unit 54 as a key, and reads out the operation state using each terminal ID extracted by the extraction unit 54. Thus, the extraction unit 54 can acquire the operation state of the candidate destination terminal communicable with the request source terminal that has requested a login. The extraction unit 54 also searches the terminal management table 502 using the terminal ID extracted by the extraction unit 54 as a search key, and extracts the operation state of the request source terminal that has requested a login.

The terminal state confirmation unit 56 searches the terminal management table 502 using the terminal. ID or the destination name as a search key to confirm the corresponding operation state.

The destination list management unit 57 adds or deletes the terminal ID of the destination terminal, for each terminal ID of the request source terminals in the destination list management table 504.

The storage/reading processing unit 59 stores various types of data in the storage device 58, and reads out the various types of data stored in the storage device 58.

[A Method of Holding a Meeting]

Figure 13:
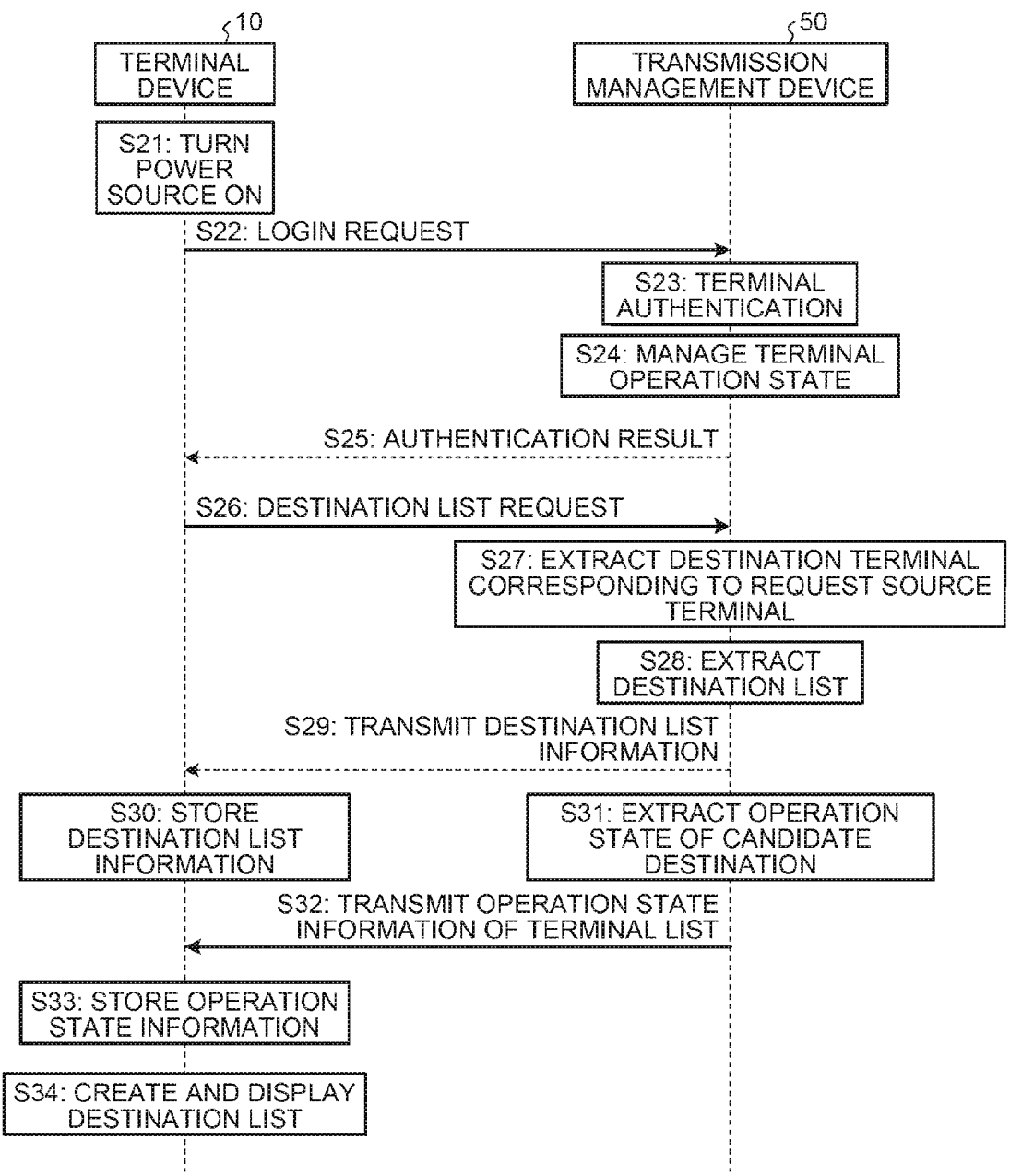
FIG. 13 is a sequence diagram illustrating a mutual authentication process performed in the present embodiment.

A process executed when the terminal device 10 logs into the teleconference system 1 and participates n the conference will now be described based on the sequence diagram illustrated in FIG. 13.

The user first turns ON the power source switch 109 (refer to FIG. 3) (step S21). In response thereto, the terminal device 10 issues a login request including the terminal ID and the password, to the transmission management device 50 (step S22).

The terminal authentication unit 52 of the transmission management device 50 searches the terminal authentication management table 500 (refer to FIG. 10) of the storage device 58, using the terminal ID and the password included in the login request received via the transmission and reception unit 51 as search keys. The terminal authentication unit 52 then determines whether the same terminal ID and the same password are managed in the terminal authentication management table 500 to perform terminal authentication (step S23). When the authentication is successful, the terminal management unit 53 stores the operation state, the reception date and time when the login request is received, and the IP address of the terminal device 10 in an associated manner, for each record indicated by the terminal ID and the destination name of the terminal device 10 of the login request source, in the terminal management table 502 (refer to FIG. 12) (step S24). Then, the terminal authentication unit 52 transmits the authentication result (authentication successful) to the terminal device 10 of the login request source, via the transmission and reception unit 51 (step S25).

Upon receiving the authentication result (authentication successful), the terminal device 10 issues a destination list request to the transmission management device 50 (step S26). Consequently, the extraction unit 54 of the transmission management device 50 searches the destination list management table 504 (refer to FIG. 12), using the terminal ID of the terminal device 10 of the destination list request source as a search key, and extracts the terminal ID of the candidate destination terminal communicable with the terminal device 10 of the destination list request source. The extraction unit 54 also reads out the destination name corresponding to the terminal ID, from the terminal management table 502 (refer to FIG. 11) (step S27).

Next, the storage/reading processing unit 59 of the transmission management device 50 reads out data in a destination list frame from the storage device 58 (step S28). The storage/reading processing unit 59 then transmits the "destination list information" (destination list frame, terminal ID, and destination name) including the destination list frame as well as the terminal ID and the destination name extracted by the extraction unit 54, to the terminal device 10 of the destination list request source (step S29). Consequently, the terminal device 10 of the request source stores the received destination list information in a management information storage unit (step S30).

Further, the extraction unit 54 of the transmission management device 50 searches the terminal management table 502 (refer to FIG. 11) using the terminal ID of the candidate destination terminal that has been previously extracted as a search key, and reads out the corresponding operation state of each terminal ID of the candidate destination terminal (step S31).

Next, the transmission and reception unit 51 of the transmission management device 50 transmits "terminal operation state information" including the terminal ID used as a search key at S17 described above, and the operation state of the corresponding destination terminal, to the terminal device 10 of the request source (step S32).

Consequently, the terminal device 10 of the request source stores the received "terminal operation state information" in the management information storage unit (step S33). In this manner, the terminal device 10 of the request source can acquire the operation state of the communicable candidate destination terminal, at the current point.

Next, the terminal device 10 of the request source creates and displays the destination list that reflects the state of the terminal device 10 as the destination candidate, based on the destination list information and the terminal operation state information stored in the management information storage unit. FIG. 14 exemplary illustrates the destination list displayed on the display 120 connected to the terminal device 10.

The process executed when the terminal device 10 logs into the teleconference system 1 has been described above. In the present embodiment, in response to the user selecting the desired terminal device 10 from the destination list (refer to FIG. 14) being displayed, the transmission and reception of content data between the selected terminal device 10 and the subject terminal device 10 is configured to be in a standby mode. When the terminal device 10 selected by the user has already been in conference with the other terminal device 10, the transmission and reception of the content data between the user (of the terminal device 10) and all the terminal devices 10 that are participating in the conference is brought into a standby state.

[Functional Configurations of the Terminal Device 10 and the Relay Device 30]

The functional blocks of the terminal device 10 and the relay device 30 of the present embodiment 11 now be described.

Figure 15:
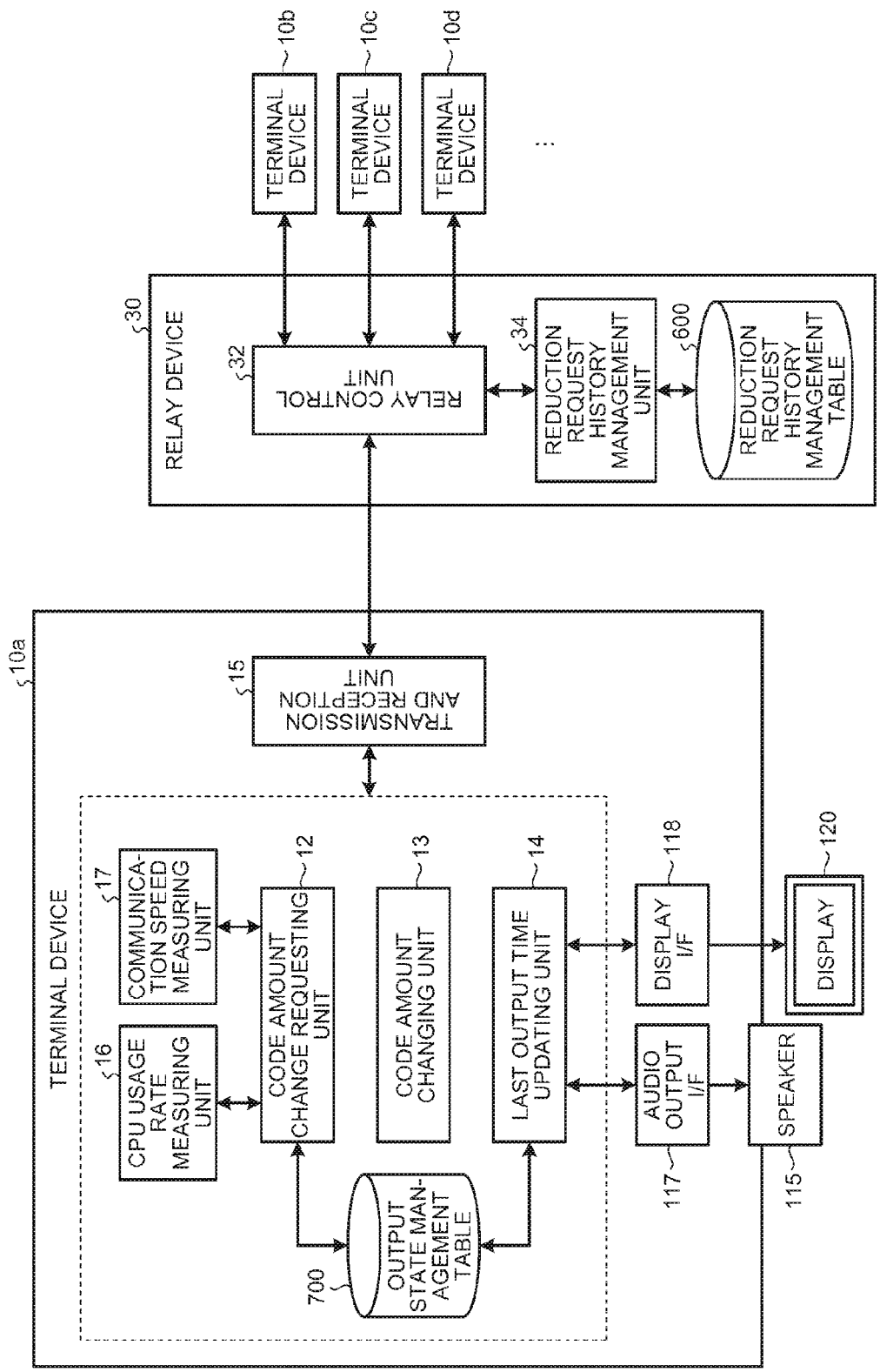
FIG. 15 is a functional block diagram of the terminal device and the relay device of the present embodiment.

FIG. 15 illustrates functional blocks of the terminal device 10 and the relay device 30 of the present embodiment. As illustrated in FIG. 15, the terminal device 10 of the present embodiment includes a code amount change requesting unit 12, a code amount changing unit 13, the last output time updating unit 14, and the transmission and reception unit 15.

The code amount change requesting unit 12 is a functional unit that transmits a request for reducing the code amount of predetermined content data (hereinafter, referred to as a code amount reduction request) selected by the user, to the destination transmission source of the content data, in response to detecting the output delay of the content data. The code amount changing unit 13 is a functional unit that executes a process of reducing the code amount of the transmission data, in response to the code amount reduction request the transmission source of which is the other terminal device 10.

The last output time updating unit 14 is a functional unit that updates the last output time (will be described below) of the predetermined content data selected by the user. The transmission and reception unit 15 is a functional unit that transmits and receives various types of data with the other terminal device 10 via the relay device 30.

The relay device 30 of the present embodiment includes the relay control unit 32 and a reduction request history management unit 34.

The relay control unit 32 is a functional unit that sends the various types of data received from the terminal device 10 to the specified destination. The reduction request history management unit 34 is a functional unit that manages the history of the code amount reduction request received from the terminal device 10.

[Operations of the Terminal Device 10 and the Relay Device 30]

The functional blocks of the terminal device 10 and the relay device 30 have been briefly described.

Figure 16:
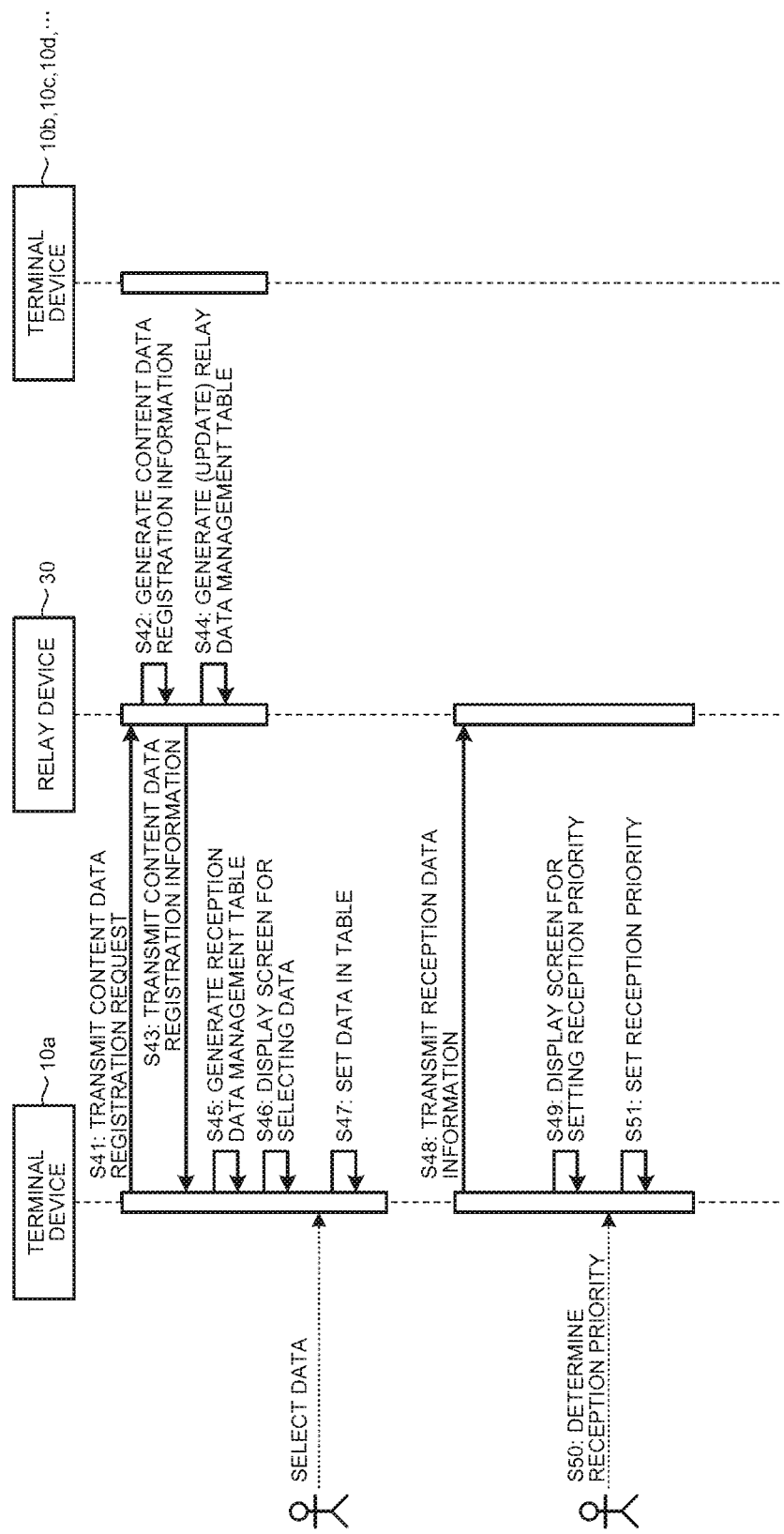
FIG. 16 is a sequence diagram illustrating a process performed by the teleconference system of the present embodiment.

Subsequently, the contents of a specific process executed by each functional unit illustrated in FIG. 15 will now be described based on the sequence diagram illustrated in FIG. 16. In the following explanation, reference will be made to FIG. 15 as needed.

The user selects a desired destination from the destination list (refer to FIG. 14) displayed on the display 120 of the terminal device 10a to participates in a conference. At this time, a user interface (UI) control unit not illustrated) of the terminal device 10a displays an input screen for receiving the registration and cancellation of the content data the user wishes to transmit on the display 120.

[A Generation Example of the Reception Data Management Table (2)]

Subsequently, the contents of the specific process of another method for generating the reception data management table will now be described based on the sequence diagram illustrated in FIG. 16.

When the user selects the content data the user wishes to transmit via the input screen, the UI control unit (not illustrated) transmits a registration request of the selected content data to the relay device 30 (S41).

Consequently, the relay device 30 denotes a data ID to each content data the registration of which is requested from the terminal device 10a, the data ID being unique to the conference in which the terminal device 10 is currently participating. The relay device 30 also generates content data registration information that is list of data names and data IDs of the content data registered by all the terminal devices 10 (including the terminal device 10a) that are participating in the conference (S42). The relay device 30 then transmits the content data registration information to the terminal device 10a (S43).

At the same time, the relay device 30 generates a relay data management table 600 (updates the content if the relay data management table 600 has already been generated) illustrated in FIG. 17(a) (S44). As illustrated in FIG. 17(a), the relay data management table 600 includes a field 602 for storing a session ID, a field 604 for storing a data ID, and a field 606 for storing the terminal ID of the terminal device 10 that is the transmission source of the code amount reduction request of the content data, relative to the content data relayed by the relay device 30. The relay data management table 600 manages the values of the fields in an associated manner.

The code amount change requesting unit 12 of the terminal device 10a generates a reception data management table 700 illustrated in FIG. 18(a), in response to the UI control unit (not illustrated) receiving the content data registration information from the relay device 30 (S45). As illustrated in FIG. 18(a), the reception data management table 700 includes a field 702 for storing a data ID, a field 704 for storing the last output time, and a field 706 for storing the state corresponding to the code amount reduction request, relative to the content data received from the other terminal devices 10 (10b, 10c, 10d . . . ).

Subsequently, the UI control unit (not illustrated) of the terminal device 10a generates a selection screen including a list of content data to be received by the terminal device 10a in the conference, based on the content data registration information received from the relay device 30. The UI control unit then displays the selection screen on the display 120 (S46). The user selects at least one of the content data the user wishes to output without delay, via the input screen. More specifically, the user who regards the comments of the participants of the conference most important may select the audio data of each base, from a plurality of content data to be received.

In response to receiving an input selected by the user via the UI control unit (not illustrated), the code amount change requesting unit 12 sets the data ID of the selected content data, in the field of the reception data management table 16 (refer to FIG. 8) (S47). FIG. 18(b) illustrates the reception data management table 700 in which the data ID is being set.

Subsequently, the terminal device 10a transmits reception data information to the relay device 30 (S48). The terminal device 10a then display a screen for setting the reception priority (S49), receives the reception priority determined by the user (S50), and sets the reception priority being determined at this point (S51).

In other words, similar to the embodiment described above, the reception priority management unit 13 generates the reception data management table. The reception data management table is a table used by the terminal device 10*a* for controlling the reception of data. The reception data management table 16 has five column fields to store the "priority", the "reception data ID", the "last output time", the "reception state", and the "cause of stopping the reception".

At the point where the procedure described above has finished, the terminal device 10*a* transmits the own content data that specifies the other terminal device 10 (10*b*, 10*c*, 10*d* . . . ) as the destination, to the relay device 30. The terminal device 10*a* also receives the content data of the other terminal device 10 (10*b*, 10*c*, 10*d* . . . ) that is addressed to the subject terminal device 10*a*, from the relay device 30. At this time, the data ID is stored in the packet of the content data transmitted and received via the relay device 30.

Thus, the reception data management table can be created by such an operation.

As described above, the teleconference will begin after the reception data management table has been prepared as described above. With the start of the teleconference, the terminal devices 10 (10*b*, 10*c*, and 10*d*) of the three bases transmit data (data stream) addressed to the terminal device 10*a* of the Tokyo office, the relay device 30*a*. At this time, each of the terminal devices 10 stores the data ID in the packet of the data to be transmitted.

Figure 18:
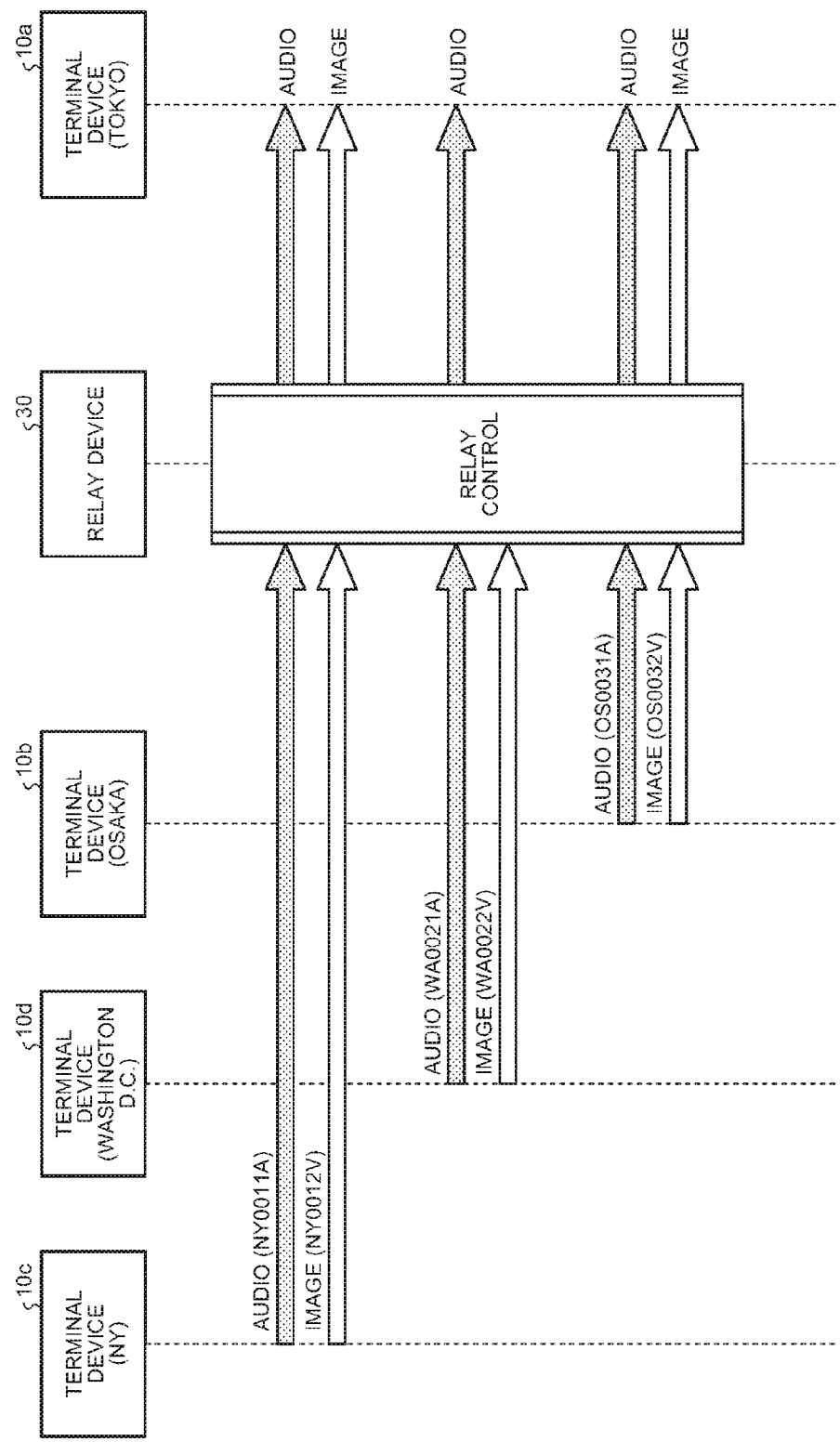
FIG. 18 a conceptual diagram illustrating a state of data being relayed in the teleconference system of the present embodiment.

The relay control unit 32 of the relay device 30*a* that has received the data from each of the bases controls the data relay using the relay data management table 36, as described above. FIG. 18 illustrates a state of data being relayed immediately after the teleconference has started. The relay control unit 32 searches the "relay data ID" field in the relay data management table 36 illustrated in FIG. 7(*b*), using the data ID included in the packet of the data received from the terminal devices 10 (10*b*, 10*c*, and 10*d*) of the three bases as a key. The relay control unit 32 then sends the data with which the "transmission is enabled" is set in the "transmission state" field corresponding to the matched data ID, to the terminal device 10*a* of the Tokyo office. The relay control unit 32 discards the data with which the "transmission is disabled" is set in the "transmission state" field corresponding to the matched data ID. As a result, only five data (the audio data and image data of the New York office, the audio data of the Washington D.C. office, and the audio data and image data of the Osaka office) desired by the user are sent to the terminal device 10*a* of the Tokyo office.

At this time, if the time from when the terminal device 10 (10*b*, 10*c*, and 10*d*) of the transmission source has transmitted data to when the destination terminal device 10*a* outputs a signal corresponding to the data to the own output device becomes tong and exceeds the allowable range, the user of the Tokyo office senses the degradation (delay) of the image and sound, which reduces the communication quality between the bases.

In regard to this point, in the present embodiment, the reception of lower priority data is forcibly stopped before the user senses the degradation (delay) of the image and sound, to prevent the degradation of output quality of higher priority data.

The degradation (delay) of output quality is caused by the "transmission delay" resulting from the communication state of the communication network and the "internal processing delay" resulting from the processing time from when data is received to when an output signal is generated. However, irrespective of the cause, a sign of degradation (delay) of output quality appears as an increase in the time interval of outputting output signals. The present embodiment focuses on this point, and detects output quality based on the output time interval of the output signals.

In the following, to detect the output quality, a process executed by the last output time updating unit 14 of the terminal device 10 of the present embodiment will be described. The last output time updating unit 14 stores the system time (hereinafter, referred to as a last output time) that is the time when the output signal corresponding to the received data is last output to the corresponding output device, in the "last output time" field of the reception data management table 16. The last output time updating unit 14 updates the value every time a new output signal is output.

More specifically, the last output time updating unit 14 stores the last output time that is the time when the audio output I/F 117 (refer to FIG. 3) has output an audio signal generated based on audio data the transmission source of which is the other terminal device 10, to the speaker 115 (refer to FIG. 3), in the "last output time" field corresponding to the audio data. The last output time updating unit 14 updates the value every time a new audio signal is output. The last output time updating unit 14 also stores the last output time that is the time when the display I/F 118 has output an image signal generated based on image data the transmission source of which is the other terminal device 10, to the display 120 (refer to FIG. 3), in the "last output time" field corresponding to the image data. The last output time updating unit 14 updates the value every time a new output signal is output. The last output time updating unit 14 may also update the time (time stamp) when drawing data (data obtained by decoding image data received from the transmission source via a network) is delivered to a drawing module, as the last output time.

FIG. 8(*c*) illustrates the reception data management table 16 after the terminal device 10*a* of the Tokyo office has started receiving data. When the terminal device 10*a* starts receiving data, as illustrated in FIG. 8(*c*), the latest last output time is set in the "last output time" field of each data.

The process executed by the last output time updating unit 14 has been described above. Subsequently, a process executed by the data reception control unit 12 will be described. The data reception control unit 12 according to the present embodiment performs a process of forcibly stopping the reception of data with low priority, when degradation of output quality of data with high priority is detected in advance, as a result of monitoring the output time interval of the output signals.

In the present embodiment, data (hereinafter, referred to as priority data) the user wishes to maintain the output quality is first defined in the preceding stage. More specifically, using a parameter n, data the priority of which is within the top n-th (priority degree is equal to or less than n) in the reception data management table 16 is defined as priority data. The parameter n may be a fixed value or the user may set an optional value. In the reception data management table 16 illustrated in FIG. 8(*c*), when the parameter n is set to 2, the audio data (ID=NY0011A) of the New York office having the first priority, and the image data (ID=NY0012V) of the New York office having the second priority are defined as the priority data.

In the following, the content of a process executed by the data reception control unit 12 will be described, when the audio data and image data of the New York office are defined as the priority data, under the circumstances in which the delay of the image of the New York office has been increasing.

Figure 19:
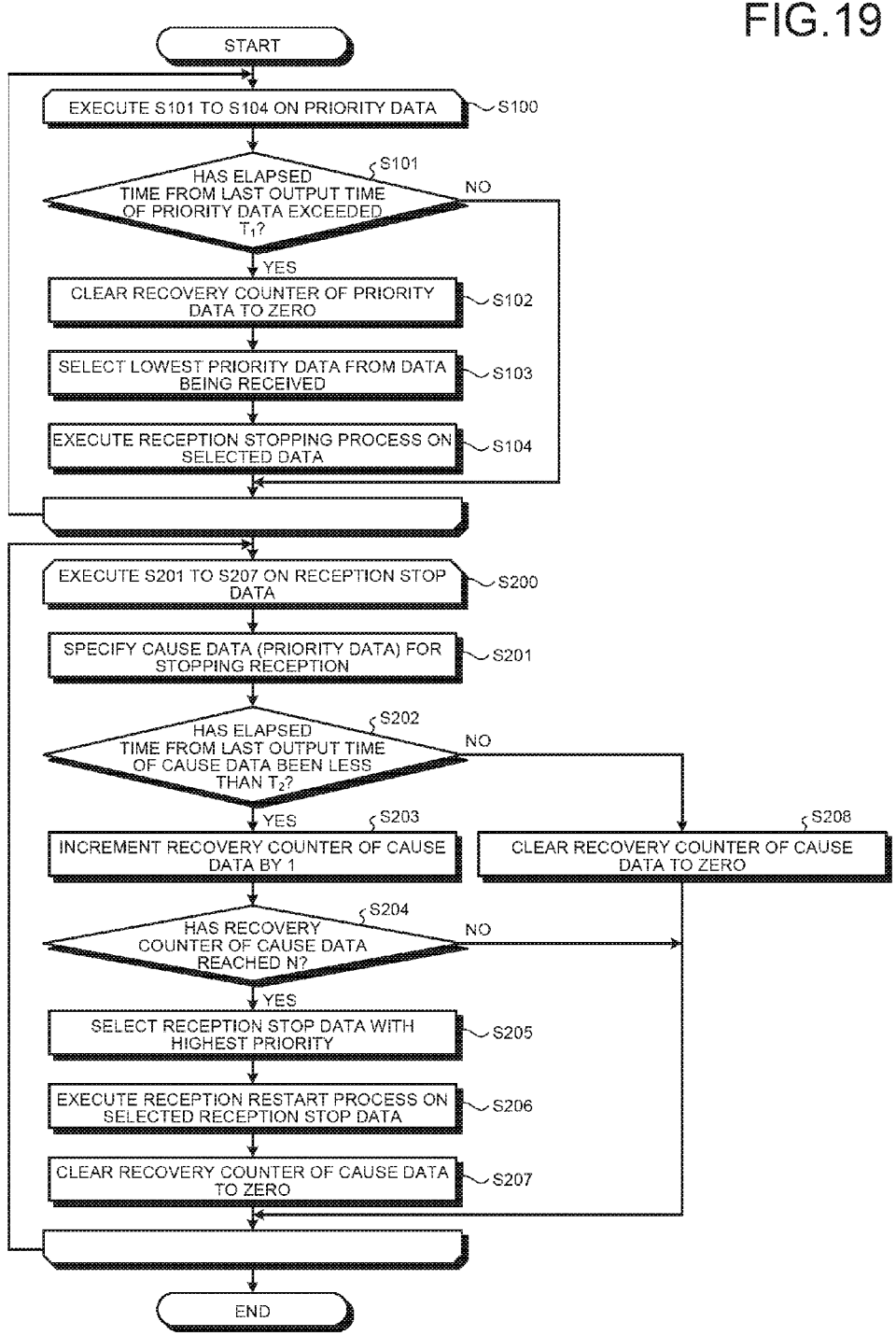
FIG. 19 is a flowchart illustrating a process executed by a data reception control unit according to the present embodiment.

FIG. 19 is a flowchart illustrating a process executed by the data reception control unit 12. As illustrated in FIG. 19, the data reception control unit 12 executes a routine including a first loop process (step 100) and a subsequent second loop process (step 200). The data reception control unit 12 repeatedly executes the routine including the two loop processes at a predetermined timing.

In the first loop process (step 100), the following steps 101 to 104 are sequentially executed on n data defined as the "priority data", in the descending order of priority. In this case, at step 101, it is determined whether the elapsed time from the last output time of the audio data (ID=NY0011A) of the New York office having the first priority has exceeded a first threshold $T_1$. More specifically, an elapsed time is calculated from the difference between the time stored in the "last output time" field corresponding to the data ID "NY0011A" in the reception data management table 16, and the current time. Then, it is determined whether the elapsed time has exceeded the threshold $T_1$.

In this case, because the output state of the audio of the New York office is stable, at step 101, it is determined that the elapsed time has not exceeded the threshold $T_1$ (No at step 101), and the process on the audio data of the New York office is finished at this point. Then, the process returns to step 101, where it is determined whether the elapsed time from the last output time of the image data (ID=NY0012V) of the New York office having the second priority has exceeded the first threshold $T_1$. More specifically, an elapsed time is calculated from the difference between the time stored in the "last output time" field corresponding to the data ID "NY0012V" in the reception data management table 16, and the current time. Then, it is determined whether the elapsed time has exceeded the threshold $T_1$.

In this case, under the circumstances in which the delay of the image of the New York office has been increasing, at step 10, it is determined that the elapsed time has exceeded the threshold $T_1$ (Yes at step 101), and the process proceeds to step 102.

At step 102, the recovery counter of the priority data that is determined to have exceeded the threshold $T_1$ is cleared to zero. More specifically, a dedicated recovery counter is prepared for the image data (ID=NY0012V) of the New York office, and the counter is cleared to zero.

In this example, the threshold $T_1$ described above is defined as the upper limit value of the output time interval of the output signals corresponding to the desired output quality. If the output time interval exceeds the threshold $T_1$, the user starts sensing the delay of image and audio. A common value may be defined for the threshold $T_1$ of the audio data and the image data, or a specific value may be defined for each type of data.

At subsequent step 103, data with the lowest priority is selected from the data being received. More specifically, the reception data management table 16 is referred to extract the data ID of the data set with the lowest priority, from the data the "reception state" of which is the "reception is required".

If the reception data management table 16 is in the state as illustrated in FIG. 20(d), at step 103, the data ID "OS0032V" of the image data of the Osaka office having the fifth priority is extracted.

At subsequent step 104, a reception stopping process is executed on the selected data. More specifically, a "transmission stop request" including the data ID "OS0032V" extracted at step 103 is generated, and the "transmission stop request" is issued to the relay device 30a. Then, the reception data management table 16 is updated to the state as illustrated in FIG. 20(e). In other words, the value of the "reception state" field corresponding to the data ID "OS0032V" is changed from the "reception is required" to the "reception is stopped". Also, the data ID "NY0012V" of the image data of the New York office is set in the "cause of stopping the reception" field corresponding to the data ID "OS0032V". In the present embodiment, the reception stopping process means a process of transmitting a "transmission stop request" to the relay device 30a to request the relay device 30a to stop and control the transmission. To stop and control the transmission may be to stop and control the transmission until the session between the terminal devices is finished.

At this time, the relay device 30a that has received the transmission stop request from the data reception control unit 12 of the terminal device 10a of the Tokyo office updates the relay data management table 36 as illustrated in FIG. 21(c). More specifically, the relay device 30a searches the "relay data ID" field in the relay data management table 36, using the data ID "OS0032V" included in the received transmission stop request as a key, and updates the value in the "transmission state" field correspond to "OS0032V" from the "transmission is enabled" to the "transmission is disabled". After the relay data management table 36 is updated as illustrated in FIG. 21(c), the relay control unit 32 of the relay device 30a discards the image data (ID =OS0032V) of the Osaka office addressed to the terminal device 10a of the Tokyo office, without sending the image data (ID=OS0032V) to the terminal device 10a.

The first loop process (step 100) on the two data (audio data and image data of the New York office) that are defined as the "priority data" is finished. The process now proceeds to the subsequent second loop process (step 200). In the second loop process (step 200), the following steps 201 to 207 are sequentially executed on one or more data (hereinafter, referred to as reception stop data) the reception of which has stopped in the first loop process (step 100), in the descending order of priority.

First, at step 201, the reception data management table 16 is referred to specify the data (hereinafter, referred to as cause data) being the cause of stopping the reception of the reception stop data (in the present scenario, the image data of the Osaka office). In this example, if the reception data management table 16 is in the state as illustrated in FIG. 11(e), at step 201, the value "NY0011V" set in the "cause of stopping the reception" corresponding to the image data of the Osaka office the "reception state" of which is the "reception is stopped", is specified as the data ID of the audio data of the New York office, causing to stop receiving the image data of the Osaka office.

At subsequent step 202, is determined whether the elapsed time from the last output time of the cause data (image data of the New York office) specified at step 201 is less than a second threshold $T_2$. More specifically, the reception data management table 16 is referred to calculate an elapsed time from the difference between the time value stored in the "last output time" field corresponding to the data ID "NY0011V" specified at step 201 and the current time. Then, it is determined whether the elapsed time has exceeded the threshold $T_2$.

In this example, similar to the threshold $T_1$ used at step 101 in the first loop process, the threshold described above is considered as the output time interval of the output signals corresponding to the desired output quality. However, it is preferable that the value of the threshold $T_2$ is sufficiently smaller than the threshold and the value of the threshold $T_2$ must be bigger than the time interval during which the transmission source transmits the data corresponding to the output signal. Similar to the threshold $T_1$, a common value may be defined for the threshold $T_2$ of the audio data and the image data, or a specific value may be defined for each type of data (audio or image).

As a result of the determination at step 202, if it is determined that the elapsed time is not less than the threshold $T_2$ (No at step 202), the process proceeds to step 208, and the recovery counter of the cause data is cleared to zero. In this case, if the communication state of the communication network or the high load state inside the terminal device 10*a* has not improved sufficiently, even if the reception of the image data of the Osaka office is being stopped, at step 202, it is determined that the elapsed time is not less than the threshold $T_2$ (No at step 202). Thus, the recovery counter of the cause data (image data of the New York office) is cleared to zero. At this point, the process on all the reception stop data has finished, thereby completing the second loop process (step 200).

Upon completing the second loop process (step 200), the first loop process (step 100) will start again at the next appropriate timing.

At step 101, it is determined that the elapsed time from the last output time of the audio data (ID=NY0011A) of the New York office having the first priority has not exceeded the first threshold $T_1$ (No at step 101), and the process on the audio data of the New York office is finished. Then again at step 101, it is determined whether the elapsed time from the last output time of the image data (ID=NY0012V) of the New York office having the second priority has exceeded the first threshold $T_1$.

At this time, if the communication state of the communication network or the high load state inside the terminal device 10*a* has not improved substantially, even if the reception of the image data of the Osaka office is being stopped, at step 101, it is determined that the elapsed time has exceeded the threshold $T_1$ (Yes at step 101), and the process proceeds to step 102.

At step 102, the recovery counter of the image data (ID=NY0012V) of the New York office that is determined to have exceeded the threshold $T_1$ is cleared to zero. At subsequent step 103, the reception data management table 16 is referred to select the lowest priority data from the data being received. In this example, if the reception data management table 16 is in the state as illustrated in FIG. 20(*e*), at step 103, the data ID "OS0031A" of the audio data of the Osaka office having the fourth priority is extracted.

At subsequent step 104, the reception stopping process will be executed on the selected data. More specifically, a "transmission stop request" including the data ID "OS0031A" extracted at step 103 is generated, and the "transmission stop request" is issued to the relay device 30*a*. Then, the reception data management table 16 is updated to the state as illustrated in FIG. 20(*f*). In other words, the value of the "reception state" field corresponding to the data ID "OS0031A" is changed from the "reception is required" to the "reception is stopped", and the data ID "NY0012V" of the image data of the New York office is set in the "cause of stopping the reception" field corresponding to the data ID "OS0031A".

At this time, the relay device 30*a* that has received the transmission stop request from the data reception control unit 12 of the terminal device 10*a* of the Tokyo office updates the relay data management table 36 as illustrated in FIG. 21(*d*). More specifically, the relay device 30*a* searches the "relay data ID" field in the relay data management table 36 using the data ID "OS0031A" included in the received transmission stop request as a key, and updates the value in the "transmission state" field corresponding to "OS0031A" from the "transmission is enabled" to the "transmission is disabled". After the relay data management table 36 is updated as illustrated in FIG. 21(*d*), the relay control unit 32 of the relay device 30*a* discards the audio data (ID=OS0031A) of the Osaka office addressed to the terminal device 10*a* of the Tokyo office, without sending the audio data (ID=OS0031A) to the terminal device 10*a*.

The first loop process (step 100) is now finished, and in the subsequent second loop process (step 200), the following steps 201 to 207 are sequentially executed on the current reception stop data, in the descending order of priority.

First, at step 201, the audio data of the New York office that is the cause data of the reception stop data (audio data of the Osaka office) having the highest priority is acquired. At subsequent step 202, it is determined whether the elapsed time from the last output time of the cause data (image data of the New York office) is less than the second threshold $T_2$.

If the communication state of the communication network or the high load state inside the terminal device 10*a* has improved as a result of stopping the reception of the audio data in addition to the image data of the Osaka office, and if the image of the New York office is maintained at high quality, at step 202, it is determined that the elapsed time is less than the threshold $T_2$ (Yes at step 202). The process then proceeds to step 203. At step 203, the recovery counter of the cause data (image data of the New York office) is incremented by 1. Then, at subsequent step 204, it is determined whether the value of the recovery counter has reached a threshold N.

As a result of the determination at step 204, if it is determined that the value of the recovery counter has not reached the threshold N, the process on the audio data (reception stop data) of the Osaka office is finished at this point, and returns to step 201 again. At step 201, the cause data (image data of the New York office) is specified for the reception stop data (image data of the Osaka office) having the second priority. Then, is determined whether the elapsed time from the last output time is less than the second threshold $T_2$ (step 202).

At this point when the image of the New York office is maintained at high quality, at step 202, it is determined that the elapsed time is less than the threshold $T_2$ (Yes at step 202). At subsequent step 203, the recovery counter of the cause data (image data of the New York office) is incremented by 1. Then, it is determined whether the value of the recovery counter has reached the threshold N.

As the result of the determination at step 204, if it is determined that the value of the recovery counter has not reached the threshold N, the process on the image data (reception stop data) of the Osaka office is finished. At this point, the process on all the reception stop data is finished, thereby completing the second loop process (step 200).

Upon completing the second loop process (step 200), the first loop process (step 100) will start again at the next appropriate timing.

At step 101, it is sequentially determined whether each of the elapsed time from the last output time of the audio data (ID=NY0011A) of the New York office having the first priority and the image data (ID=NY0012V) of the New York office having the second priority, has exceeded the first threshold $T_1$. At this point when both the image and audio of the New York office are maintained at high quality, the elapsed time of both the audio data and the image data have not exceeded the threshold $T_1$ (No at step 101). Thus, the first loop process (step 200) finishes without any further step.

In the subsequent second loop process (step 200), the following steps 201 to 207 are subsequently executed on the current reception stop data, in the descending order of priority.

At step 201, it is determined whether the elapsed time from the last output time of the cause data (image data of the New York office) of the reception stop data (audio data of the Osaka office) having the highest priority is less than the second threshold $T_2$.

At this point when the image of the New York office is maintained at high quality, at step 202, it is determined that the elapsed time is less than the threshold $T_2$ (Yes at step 202), and the process proceeds to step 203. At step 203, the recovery counter of the cause data (image data of the New York office) is incremented by 1. At subsequent step 204, it is determined whether the value of the recovery counter of the cause data (image data of the New York office) has reached the threshold N.

As the result of the determination at step 204, if it is determined that the value of the recovery counter has not reached the threshold N, the process on the audio data (reception stop data) of the Osaka office is finished at this point, and the process returns to step 201 again, At step 201, the cause data (image data of the New York office) is specified for the reception stop data (image data of the Osaka office) having the second priority. Then, it is determined whether the elapsed time from the last output time of the cause data is less than the second threshold $T_2$ (step 202).

Similarly, at this point when the image of the New York office is maintained at high quality, it is determined that the elapsed time is less than the threshold $T_2$ (Yes at step 202). At subsequent step 203, the recovery counter of the cause data (image data of the New York office) is incremented by 1, and it is determined whether the value of the recovery counter has reached the threshold N.

As the result of the determination at step 204, if it is determined that the value of the recovery counter has not reached the threshold N, the process on the image data (reception stop data) of the Osaka office is finished. At this point, the process on all the reception stop data has finished thereby completing the second loop process (step 200).

Upon completing the second loop process (step 200), the first loop process (step 100) will start again at the next appropriate timing, and the process described above will be repeated thereafter.

As is obvious from the above description, the reception data management table 16 is maintained in the state as illustrated in FIG. 22(g), from when the image quality of the image of the New York office has sufficiently improved until when step 203 in the second loop process (step 200) is repeated for N times.

Hence, in the present embodiment, in view of stable operation, the reception of the reception stop data is not immediately restarted at the point where the output state of the priority data has improved. Instead, the reception of the reception stop data is restarted after the stable output state of the priority data has continued for a predetermined time or more. Thus, it is preferable to define a suitable value for the threshold N that is referred to at step 204, according to the object of the stable operation.

At step 204, after step 203 in the second loop process (step 200) is repeated for N times for the cause data (image data of the New York office), it is determined that the value of the recovery counter of the cause data (image data of the New York office) has reached the threshold N (Yes at step 204), and the process proceeds to step 205.

At step 205, the highest priority data is selected from the reception stop data the reception of which has been currently stopped, due to the cause data (in other words, the audio data of the New York office) corresponding to the recovery counter the counter value of which has reached the threshold N. In this example, if the reception data management table 16 is in the state as illustrated in FIG. 22(g), at step 205, the data ID "OS0031A" of the audio data of the Osaka office having the fourth priority is extracted from the data the "reception state" of which is the "reception is stopped".

At subsequent step 206, a reception restart process will be executed on the selected reception stop data. More specifically, a "transmission restart request" including the data ID "OS0031A" extracted at step 205 is generated, and the "transmission restart request" is issued to the relay device 30a. Then, the reception data management table 16 is updated as illustrated in FIG. 22(h). In other words, the value in the "reception state" field corresponding to the data ID "OS0031A" is changed from the "reception is stopped" to the "reception is required". Also, the value "NY0011V" set in the "cause of stopping the reception" corresponding to the data ID "OS0031A" is deleted.

At this time, the relay device 30a that has received the transmission restart request from the data reception control unit 12 of the terminal device 10a of the Tokyo office updates the relay data management table 36 as illustrated in FIG. 21(e). More specifically, the relay device 30a searches the "relay data ID" field in the relay data management table 36, using the data ID "OS0031A" included in the received transmission restart request as a key. The relay device 30a then updates the value in the "transmission state" field corresponding to "OS0031A" from the "transmission is disabled" to "transmission is enabled". After the relay data management table 36 is updated as illustrated in FIG. 21(e), the relay control unit 32 of the relay device 30a restarts sending the audio data (ID=OS0031A) of the Osaka office addressed to the terminal device 10a of the Tokyo office, to the terminal device 10a.

At subsequent step 207, the recovery counter of the cause data (image data of the New York office), the counter value of which has reached the threshold N, is cleared to zero. At this point, the process on the audio data (reception stop data) of the Osaka office is finished, and the process returns to step 201.

At step 201, the cause data (image data of the New York office) is specified for the reception stop data (image data of the Osaka office) having the second priority. Then, it is determined whether the elapsed time from the last output time is less than the second threshold $T_2$ (step 202).

Similarly, at this point when the image of the New York office is maintained at high quality, it is determined that the elapsed time is less than the threshold $T_2$ (Yes at step 202). At subsequent step 203, the recovery counter of the cause data (image data of the New York office) is incremented by 1, and it is determined whether the value of the recovery counter has reached the threshold N.

At the preceding step 207 performed on the audio data (reception stop data) of the Osaka office, the recovery counter of the cause data (image data of the New York office) has been cleared to zero. Thus, the value of the recovery counter at this point is one. As a result, at step 204, it is determined that the value of the recovery counter has not reached the threshold N (No at step 204). At this point, the process on the audio data (reception stop data) of the Osaka office is finished, thereby completing the second loop process (step 200).

Upon completing the second loop process (step 200), the first loop process (step 100) will start again at the next appropriate timing, and the process described above will be repeated thereafter.

In this manner, in FIG. 19 described above, the method of periodically performing the first loop process (step 100) has been described as an example. The first loop process may also be performed at the timing when high priority data is output to the user (rendering for video, and speaker output for audio). For example, in the first loop process (step 100), the processes from step S101 to step S104 are executed on the high priority data (referred to as data A) being output and received. After the first loop process is executed on the data A described above, the last output time of the data A is updated to the current value, and the process proceeds to the second loop process.

In the example of the first loop process, it is conceivable that the detection is not made "when data is output slightly after the threshold", if the check is performed only periodically. Thus, as described above, the same process as the periodical check is executed. "before" updating the last output time, every time the data to be monitored is output as described above. In this manner, for example, it is possible to control the operation upon detecting a "sign of deterioration" such as when it takes four seconds to output data relative to three seconds that is the threshold for determining the blackout.

As is obvious from the above description, the reception data management table 16 is maintained in the state as illustrated in FIG. 22(h), from when the reception of the reception stop data (audio data of the Osaka office) having the fourth priority has restarted until when step 203 in the second loop process (step 200) is repeated for N times.

In other words, in the present embodiment, in view of stable operation, the reception of all the reception stop data, the cause data of which is priority data, will not be simultaneously restarted immediately after the output state of the priory data has improved. Instead, the reception of the reception stop data will restart after the stable output of the priority data has continued for a predetermined time or more, after the reception of the preceding reception stop data has restarted.

At step 204, after step 203 in the second loop process (step 200) is repeated again for N times for the cause data (image data of the New York office), it is determined that the value of the recovery counter of the cause data (image data of the New York office) has reached the threshold N (Yes at step 204), and the process proceeds to step 205.

At step 205, the highest priority data is selected from the reception stop data the reception of which has been currently stopped, due to the cause data (in other words, the audio data of the New York office) corresponding to the recovery counter the counter value of which has reached the threshold N. In this example, if the reception data management table 16 is in the state as illustrated in FIG. 22(h), then at step 205, the data ID "OS0032V" of the image data of the Osaka office having the fifth priority the "reception state" of which is the "reception is stopped" is extracted.

At subsequent step 206, the reception restart process will be executed on the selected reception stop data. More specifically, a "transmission restart request" including the data ID "OS0032V" extracted at step 205 is generated, and the "transmission restart request" is issued to the relay device 30a. Then, the reception data management table 16 is updated as illustrated in FIG. 22(i). In other words, the value in the "reception state" field corresponding to the data ID "OS0032V" is changed from the "reception is stopped" to the "reception is required", and the value "NY0011V" set in the "cause of stopping the reception" corresponding to the data ID "OS0032V" will be deleted.

At this time, the relay device 30a that has received the transmission restart request from the data reception control unit 12 of the terminal device 10a of the Tokyo office updates the relay data management table 36 as illustrated in FIG. 21(f). More specifically, the relay device 30a searches the "relay data ID" field in the relay data management table 36, using the data ID "OS0032V" included in the received transmission restart request as a key, and updates the value in the "transmission state" field corresponding to "OS0032V" from the "transmission is disabled" to the "transmission is enabled". After the relay data management table 36 is updated as illustrated in FIG. 21(f), the relay control unit 32 of the relay device 30a restarts sending the image data (ID=OS0032) of the Osaka office addressed to the terminal device 10a of the Tokyo office, to the terminal device 10a.

As described above, according to the present invention, it is possible to output high priority data while keeping the quality as high as possible, even if degradation of output quality is caused by the transmission delay or the internal processing delay, or a mix of the transmission delay and the internal processing delay.

The functions of the embodiment described above may be implemented by a device-executable computer program written in, for example, C, C++, C#, Java (registered trademark). The computer program of the present embodiment can be stored in a device-readable recording medium such as a hard disk device, CD-ROM, magnetic-optical disk (MO), digital versatile disc (DVD), flexible disk, electrically erasable programmable read-only memory (EEPROM), and erasable programmable read-only memory (EPROM) to be distributed, or may be transmitted via a communication network in a possible form by other apparatuses.

Although the present invention has been described based on the embodiment of the teleconference system, the present invention is not limited to the above embodiment, and the present invention may be applied to any data transmission system regardless of use, as long as the system can simultaneously transmit a plurality of content data to a terminal device via a communication network. In this case, the terminal device may be a smartphone, a general-purpose personal computer (PC), a tablet terminal, a mobile phone, an electronic blackboard, a projection device such as a projector, and a car navigation terminal mounted on a vehicle. It should also be understood that the present invention falls within the scope of the present invention, as long as it exhibits the action and effect of the present invention within the scope of the embodiment that can be easily inferred by a person skilled in the art.

REFERENCE SIGNS LIST 1 teleconference system
2a, 2b, 2c, 2d LAN
2ab, 2cd dedicated line
10 terminal device
12 data reception control unit
13 reception priority management unit
14 last output time updating unit
15 transmission and reception unit
16 reception data management table
30 relay device
32 relay control unit
36 relay data management table 50 transmission management device
70 router
80 Internet
101 CPU
102 ROM
103 RAM
104 flash memory
105 SSD
106 recording media
107 media drive
108 operation button
109 power source switch
110 busline
112 camera
114 microphone
115 speaker
119 alarm lamp
120 display
120c cable
201 CPU
202 ROM
203 RAM
205 HDD
206 recording media
207 media drive
208 display
210 bus line
211 keyboard
212 mouse
213 CD-ROM
214 CD-ROM drive
1100 casing
1110 front side wall surface
1120 rear side wall surface
1121 air discharge surface
1130 right side wall surface
1131 sound collecting hole
1140 left side wall surface
1150 operation panel
1151 sound output surface
1160 accommodating unit
1200 arm
1210 torque hinge
1300 camera housing
1310 torque Singe

CITATION LIST

Patent Literature

Patent Literature 1: Japanese Unexamined Patent Application Publication No. 2010-093505

The invention claimed is:

1. A data transmission system, comprising:
a plurality of terminal devices arranged in a communication network and configured to transmit or receive content data,
a terminal device configured to receive content data transmitted from another terminal device, among the plurality of terminal devices, the terminal device including:
processing circuitry configured to manage priority of two or more content data addressed to the terminal device, and, based on an output time interval of output signals corresponding to priority data whose priority managed by the processing circuitry is high among two or more content data being received, request a transmission source configured to transmit content data having priority lower than the priority data, to perform control to stop transmitting the content data.

2. The data transmission system according to claim 1, further comprising a relay device configured to relay two or more content data transmitted or received between the plurality of terminal devices.

3. The data transmission system according to claim 1, wherein the processing circuitry requests the relay device to perform control to stop transmitting content data with a lowest priority among two or more content data being received, when the output time interval of the output signals corresponding to the priority data with high priority has exceeded a first threshold.

4. The data transmission system according to claim 3, wherein the processing circuitry requests the relay device to restart transmission of the content data whose transmission has been requested to be stopped, when the output time interval of the priority data has become less than a second threshold that is smaller than the first threshold.

5. The data transmission system according to claim 4, wherein the processing circuitry requests restart of the transmission after a state where the output time interval of the priority data is less than the second threshold has continued for a predetermined time or more.

6. The data transmission system according to claim 4, wherein the processing circuitry requests restart of the transmission sequentially from content data with higher priority among two or more content data whose transmission has been requested to be stopped.

7. The data transmission system according to claim 6, wherein after a state where the output time interval of the priority data is less than the second threshold has continued for a predetermined time or more after reception of content data with higher priority has restarted, the processing circuitry requests restart of transmission of content data having next highest priority.

8. The data transmission system according to claim 1, wherein the terminal device is configured to receive the content data, which includes at least one of audio data and image data.

9. A terminal device among a plurality of terminal devices arranged in a communication network and configured to transmit or receive content data, the terminal device configured to receive content data transmitted from another terminal device, among the plurality of terminal devices, the terminal device comprising:
processing circuitry configured to manage priority of two or more content data addressed to the terminal device, and, based on an output time interval of output signals corresponding to priority data whose priority managed by the processing circuitry is high among two or more content data being received, request a transmission source configured to transmit content data having priority lower than the priority data, to perform control to stop transmitting the content data.

10. A non-transitory recording medium containing a computer program causing processing circuitry in a terminal device configured to receive content data transmitted from another terminal device among a plurality of terminal devices arranged in a communication network and configured to transmit or receive content data, to execute:
managing reception priority of two or more content data addressed to the terminal device, and
controlling data reception to, based on an output time interval of output signals corresponding to priority data whose priority managed at the managing reception priority is high among two or more content data being received, request a transmission source configured to transmit content data having priority lower than the priority data to perform control to stop transmitting the content data.

11. The non-transitory recording medium according to claim 10, wherein at the controlling data reception, the transmission source of the content data is requested to control to stop transmitting content data with a lowest priority among two or more content data being received, when the output time interval of the output signals corresponding to the priority data with high priority has exceeded a first threshold.

12. The non-transitory recording medium according to claim 11, wherein at the controlling data reception, the transmission source is requested to restart transmission of the content data whose transmission has been requested to be stopped, when the output time interval of the priority data has become less than a second threshold that is smaller than the first threshold.

13. The non-transitory recording medium according to claim 12, wherein at the controlling data reception, restart of the transmission is requested after a state where the output time interval of the priority data is less than the second threshold has continued for a predetermined time or more.

14. The non-transitory recording medium according to claim 12, wherein at the controlling data reception, restart of the transmission of content data is requested sequentially from content data with higher priority among two or more content data whose transmission has been requested to be stopped.

15. The non-transitory recording medium according to claim 14, wherein at the controlling data reception, after a state where the output time interval of the priority data is less than the second threshold has continued for a predetermined time or more after reception of content data with higher priority has restarted, restart of transmission of content data having next highest priority is requested.

* * * * *